US012136017B2

(12) United States Patent
Simpson

(10) Patent No.: US 12,136,017 B2
(45) Date of Patent: Nov. 5, 2024

(54) SYSTEM AND METHOD FOR DETECTING AN ADDRESS BLOCK AND BARCODE ON A CAPTURED IMAGE OF ITEM, AND READING THE DETECTED BARCODE USING CONNECTED COMPONENT ANALYSIS

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/308,529

(22) Filed: Apr. 27, 2023

(65) Prior Publication Data

US 2023/0351132 A1    Nov. 2, 2023

Related U.S. Application Data

(60) Provisional application No. 63/336,159, filed on Apr. 28, 2022.

(51) Int. Cl.
*G06K 7/14* (2006.01)
*G06T 5/20* (2006.01)
(Continued)

(52) U.S. Cl.
CPC ......... *G06K 7/1447* (2013.01); *G06K 7/1413* (2013.01); *G06T 5/20* (2013.01);
(Continued)

(58) Field of Classification Search
CPC ......... G06K 19/0718; G06K 19/07354; G06K 19/07722; G06F 3/044
See application file for complete search history.

(56) References Cited

U.S. PATENT DOCUMENTS 6,634,555 B1    10/2003  Sorrells et al.
6,837,432 B2    1/2005   Tsikos et al.
(Continued)

FOREIGN PATENT DOCUMENTS

| CN | 109784328 A | 5/2019 |
|---|---|---|
| JP | H0793474 A | 4/1995 |
| WO | WO 2020/091206 A1 | 5/2020 |

OTHER PUBLICATIONS

Chai et al. "Locating and Decoding EAN-13 Barcodes from Images Captured by Digital Cameras", Information, Communications and Signal Processing, 2005 Fifth International Conference on Bangkok, Thailand, pp. 1595-1599. Dec. 6, 2005.
(Continued)

*Primary Examiner* — Jamara A Franklin
(74) *Attorney, Agent, or Firm* — Knobbe Martens Olson & Bear LLP

(57) ABSTRACT

The present disclosure relates to a system and method for detecting an address block and barcode on a captured image of an item, and reading the detected barcode using connected component analysis. In one aspect, the method includes binarizing a captured image to generate a binarized image having pixel values, inverting the pixel values of the binarized image, processing the inverted pixel values, and filtering the processed image by area. The method may also include machine learning the processed image to cluster objects in the processed image into a plurality of groups using the filtered image, and determining a number of objects in each of the clustered groups by performing additional operations on the clustered objects to detect the address block. The method may also include selecting the group having the greatest number of objects as the address block, and extracting the selected address block.

20 Claims, 30 Drawing Sheets

(51) Int. Cl.
*G06T 7/60* (2017.01)
*G06T 7/70* (2017.01)
*G06V 10/762* (2022.01)
*G06V 30/10* (2022.01)

(52) U.S. Cl.
CPC .................. *G06T 7/60* (2013.01); *G06T 7/70* (2017.01); *G06V 10/762* (2022.01); *G06V 30/10* (2022.01); *G06T 2207/30242* (2013.01)

(56) References Cited

U.S. PATENT DOCUMENTS

| | | | |
|---|---|---|---|
| 9,213,875 | B1 | 12/2015 | Nadabar et al. |
| 10,346,659 | B1 | 7/2019 | Ahmed et al. |
| 2002/0196977 | A1 | 12/2002 | Navon |
| 2008/0008379 | A1* | 1/2008 | Andel .................. G06V 10/242 382/141 |
| 2009/0159510 | A1 | 6/2009 | Haushalter |
| 2009/0289121 | A1 | 11/2009 | Maeda et al. |
| 2011/0121069 | A1 | 5/2011 | Lindahl et al. |
| 2011/0222605 | A1 | 9/2011 | Kashiwagi et al. |
| 2012/0256007 | A1 | 10/2012 | Cok |
| 2013/0105582 | A1 | 5/2013 | Yates et al. |
| 2014/0347557 | A1 | 11/2014 | Gomita et al. |
| 2015/0054821 | A1 | 2/2015 | Kumar et al. |
| 2018/0232611 | A1 | 8/2018 | Guo |
| 2020/0092470 | A1 | 3/2020 | Tanioka et al. |

OTHER PUBLICATIONS

International Search Report and Written Opinion dated Jan. 20, 2022, in International Application No. PCT/US2021/052208.
International Preliminary Report on Patentability dated Mar. 28, 2023, in International Application No. PCT/US2021/052208.
International Search Report and Written Opinion dated Feb. 23, 2022, in International Application No. PCT/US2021/061650.
Katona et al. "A Novel Method for Accurate and Efficient Barcode Detection with Morphological Operations", 2012 Eighth International Conference on Signal Image Technology and Internet Based Systems, IEEE Computer Society, pp. 307-314. Nov. 25, 2012.
International Search Report and Written Opinion dated Aug. 28, 2023, corresponding to International Application No. PCT/US2023/020257.

* cited by examiner ized image.
SYSTEM AND METHOD FOR DETECTING AN ADDRESS BLOCK AND BARCODE ON A CAPTURED IMAGE OF ITEM, AND READING THE DETECTED BARCODE USING CONNECTED COMPONENT ANALYSIS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to and the benefit of Provisional Application No. 63/336,159 filed on Apr. 28, 2022 in the U.S. Patent and Trademark Office, the entire contents of which are incorporated herein by reference.

BACKGROUND

Technical Field

The described technology generally relates to image processing, and in particular to a system and method for detecting an address block and barcode on a captured image of an item such as a mailpiece or parcel label, and reading the detected barcode, using connected component analysis.

Description of the Related Technology

Items, such as articles of mail (e.g., letters, flats, parcels, and the like), warehouse inventories, or packages are frequently received into a processing facility in volume, and must be sorted into particular groups to facilitate further processes such as, for example, delivery of the item to a specified destination. The particular groups can correspond to destinations or other information identified on the item. Processing items or articles can include reading and processing barcode data placed on the items or articles.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for item for detecting an address block and barcode, and reading the detected barcode.

Another aspect is a method of detecting an address block from a captured image of an item, the method comprising: receiving or retrieving, at a processor, a captured image containing an address block; binarizing, at the processor, the captured image to generate a binarized image having pixel values; inverting, at the processor, the pixel values of the binarized image; processing, at the processor, the inverted pixel values; filtering, at the processor, the processed image by area; machine learning, at the processor, the processed image to cluster objects in the processed image into a plurality of groups using the filtered image; determining, at the processor, a number of objects in each of the clustered groups by performing additional operations on the clustered objects to detect the address block; selecting, at the processor, the group having the greatest number of objects as the address block; extracting, at the processor, the selected address block; and storing, in a memory, the extracted address block.

In the above method, the machine learning comprises performing unsupervised machine learning on the processed image using a density-based spatial clustering. In the above method, the filtering comprises filtering components of the processed image to a given range of sizes such that all components outside of minimum and maximum ranges are removed from the processed image.

Another aspect is a method of detecting a barcode from a captured image of an item, the method comprising: receiving or retrieving, at a processor, a captured image containing a barcode; binarizing, at the processor, the captured image to generate a binarized image having pixel values; inverting, at the processor, the pixel values of the binarized image; filtering, at the processor, the inverted image based on lengths of a major axis and a minor axis of the barcode; machine learning, at the processor, the filtered image to cluster characters in the filtered image into a plurality of groups using the filtered image; determining, at the processor, a number of objects in each of the clustered groups; selecting, at the processor, the group having the greatest number of objects as the barcode; extracting, at the processor, the selected barcode; and storing, in a memory, the extracted barcode.

The above method further comprises: creating, at the processor, a bounding box for an image to be used for training the processor based on the selected group.

Another aspect is a method of reading a barcode from a captured image of an item, the method comprising: receiving or retrieving, at a processor, a captured image containing a barcode comprising a plurality of bars; binarizing, at the processor, the captured image to generate a binarized image having pixel values; plotting, at the processor, a line over the binarized image; calculating, at the processor, the number of pixels along vertical axes of the plurality of bars of the barcode; machine learning, at the processor, the binarized image to group the plurality of bars by size based on a major axis length property of the barcode; determining, at the processor, sizes of the groups to identify different groups; calculating, at the processor, an angle of rotation from a first bar to a last bar of the plurality of bars of the barcode; rotating, at the processor, the binarized image based on the calculated rotation angle; identifying, at the processor, one or more up-bars and one or more down-bars from the plurality of bars of the barcode to identify the barcode; and reading, at the processor, the identified barcode.

In the above method, the machine learning comprises performing unsupervised machine learning on the binarized image using a k-means method.

Another aspect is a system for processing a captured image of an item, the system comprising: a memory storing instructions; and a processor configured execute the instructions to perform any one of the above methods.

Another aspect is a non-transitory computer readable medium for storing instructions, when executed by one or more processors, configured to perform any one of the above methods.

Another aspect is a method of detecting an address block from a captured image of an item, the method comprising: receiving or retrieving, at a processor, a captured image of the item containing an address block; inverting, at the processor, pixel values of the image; processing, at the processor, the inverted pixel values; filtering, at the processor, the processed image by area; machine learning, at the processor, the processed image to cluster objects in the processed image into a plurality of groups using the filtered image; determining, at the processor, a number of objects in each of the clustered groups by performing additional operations on the clustered objects to detect the address block; and selecting, at the processor, at least one of the clustered groups as the address block based on the determined number of objects.

In the above method, the selecting comprises selecting the group having the greatest number of objects as the address block. In the above method, the selecting comprises selecting a group having a predetermined number of objects as the address block. In the above method, the selecting comprises: selecting two or more groups in a predetermined number range of objects from the clustered groups; and selecting the group having the greatest number of objects in the selected two or more groups as the address block. The above method further comprises: extracting, at the processor, the selected address block; and storing, in a memory, the extracted address block. The above method further comprises reading the extracted address block using an optical character recognition (OCR) process or artificial intelligence (AI).

In the above method, the machine learning comprises performing unsupervised machine learning on the processed image to cluster the objects into the plurality of groups. In the above method, the unsupervised machine learning comprises a density-based spatial clustering of applications with a noise (DBSCAN) algorithm. In the above method, the filtering comprises filtering components of the processed image to a given range of sizes such that all components outside of minimum and maximum ranges are removed from the processed image. In the above method, the machine learning comprises identifying a barcode based on at least one of a width, a height, or an orientation of the objects being clustered.

Another aspect is a system for detecting an address block from a captured image of an item, the system comprising: a memory storing instructions; and a processor configured to execute the instructions to: receive or retrieve a captured image of the item containing an address block; invert pixel values of the image; process the inverted pixel values; filter the processed image by area; perform machine learning on the processed image to cluster objects in the processed image into a plurality of groups using the filtered image; determine a number of objects in each of the clustered groups by performing additional operations on the clustered objects to detect the address block; and select at least one of the clustered groups as the address block based on the determined number of objects.

In the above system, the processor is configured to select the group having the greatest number of objects as the address block. In the above system, the processor is configured to select a group having a predetermined number of objects as the address block. In the above system, the processor is configured to: select two or more groups in a predetermined number range of objects from the clustered groups; and select the group having the greatest number of objects in the selected two or more groups as the address block.

In the above system, the processor is further configured to: extract the selected address block; and store, in a memory, the extracted address block. In the above system, the processor is configured to perform unsupervised machine learning on the processed image to cluster the objects into the plurality of groups. In the above system, the unsupervised machine learning comprises a density-based spatial clustering of applications with a noise (DBSCAN) algorithm. In the above system, the processor is configured to filter components of the processed image to a given range of sizes such that all components outside of minimum and maximum ranges are removed from the processed image. In the above system, the processor is configured to identify a barcode based on at least one of a width, a height, or an orientation of the objects being clustered.

Another aspect is a non-transitory computer readable medium for storing instructions, when executed by one or more processors, configured to perform the above method.

Another aspect is a method of detecting a barcode from a captured image of an item, the method comprising: receiving or retrieving, at a processor, a captured image of the item containing a barcode; inverting, at the processor, pixel values of the image; filtering, at the processor, the inverted image based on lengths of a major axis and a minor axis of the barcode; machine learning, at the processor, the filtered image to cluster characters in the filtered image into a plurality of groups using the filtered image; determining, at the processor, a number of objects in each of the clustered groups; and selecting, at the processor, at least one of the clustered groups as the barcode based on the determined number of objects.

In the above method, the selecting comprises selecting the group having the greatest number of objects as the barcode. In the above method, the selecting comprises selecting a group having a predetermined number of objects as the barcode. In the above method, the selecting comprises: selecting two or more groups in a predetermined number range of objects from the clustered groups; and selecting the group having the greatest number of objects in the selected two or more groups as the barcode. The above method further comprises: extracting, at the processor, the selected barcode; and storing, in a memory, the extracted barcode. The above method further comprises: creating, at the processor, a bounding box for an image to be used for training the processor based on the selected group.

Another aspect is a method of reading a barcode from a captured image of an item, the method comprising: receiving or retrieving, at a processor, a captured image of the item containing a barcode comprising a plurality of bars; plotting, at the processor, a line over the image; calculating, at the processor, the number of pixels along vertical axes of the plurality of bars of the barcode; machine learning, at the processor, the binarized image to group the plurality of bars by size based on a major axis length property of the barcode; determining, at the processor, sizes of the groups to identify different groups; calculating, at the processor, an angle of rotation from a first bar to a last bar of the plurality of bars of the barcode; rotating, at the processor, the binarized image based on the calculated rotation angle; identifying, at the processor, one or more up-bars and one or more down-bars from the plurality of bars of the barcode to identify the barcode; and reading, at the processor, the identified barcode.

In the above method, the machine learning comprises performing unsupervised machine learning on the binarized image using a k-means method.

Another aspect is a system for processing a captured image of an item, the system comprising: a memory storing instructions; and a processor configured execute the instructions to perform one or more of the above methods.

Another aspect is a non-transitory computer readable medium for storing instructions, when executed by one or more processors, configured to perform one or more the above methods.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system. Furthermore, any aspect of a system can be configured to perform a method of another aspect.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
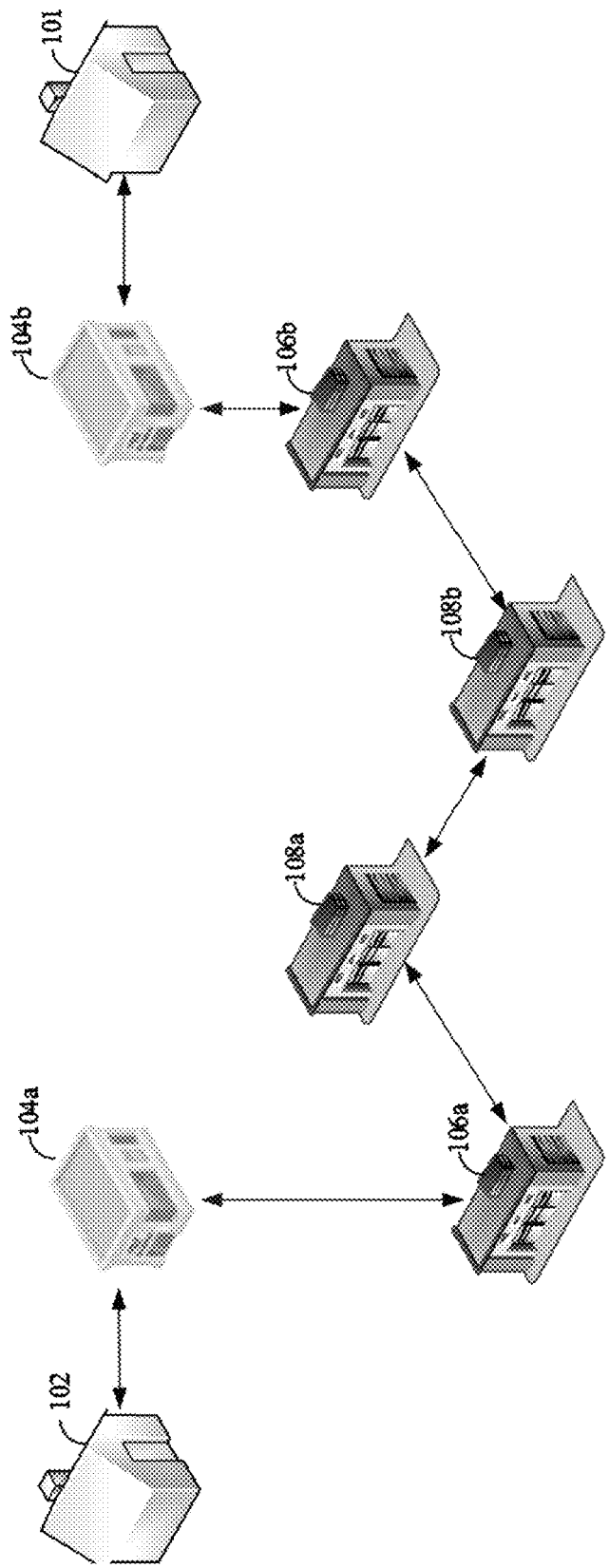
FIG. 1 is a diagram of an exemplary distribution system or network used to distribute items between shippers and recipients.

Provided herein are various embodiments of systems and methods for image processing including, for example, a system and method for detecting a feature of an item or a label, such as an address block, postage indicia, sender identifier, and/or barcode in a captured image of an item, such as a mailpiece or parcel, and reading the detected barcode, using machine-learning based connected component analysis. It is advantageous to efficiently and accurately detect a feature of an item or label, such as an address block, postage indicia, sender identifier, barcode, and/or other label or item feature on a captured image of an item, and reading the same. This can eliminate the need to process an entire image of an item to read indicia thereon, but rather only process the portion of the image having the feature of interest. By efficiently and accurately identifying and reading features of items and/or labels on a captured image of an item, the functionality of computing devices such as an item processing system is significantly improved.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. The term "item" may also include a label thereon. In this disclosure, the item may be used to cover a label or may also be interchangeably used with respect to a label. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

An item distribution system or distribution network, such as the United States Postal Service (USPS) or other shipping or item delivery service, logistics service, or other entity may process and/or deliver items, such as letters, flats, parcels, packages, and bulky items to a plurality of delivery points or destinations. The USPS will be used in the described technology to describe some exemplary embodiments, but the described technology is not limited thereto. When referencing generically to any of the services listed above or any item distribution service in addition to those listed above, the phrase "item distribution service," "delivery service," or "distribution system" will be used to indicate such generalities. The terms mail or mailpiece may be used to illustrate exemplary embodiments, but these terms are not intended to be limiting.

In an exemplary aspect described herein, the systems and methods described herein can efficiently and accurately detect and read a feature of interest, such as an address block and barcode on a captured image of an item, using machine-learning based connected component analysis so that the functionality of computing devices such as an item processing system can be significantly improved.

FIG. 1 is a diagram of an exemplary distribution network 10 (to be interchangeably used with a distribution system) that can be used to distribute items between shippers 102 and recipients 101. The distribution network 10 may be employed by an item delivery service to distribute items received and to be delivered across a geographic area. The distribution network 10 shows various distribution points or facilities. In some embodiments, the distribution network 10 may include more or fewer distribution points or facilities than shown in distribution network 10. For example, the distribution network 10 includes unit delivery facilities 104a and 104b (e.g., post offices or drop-off locations). The distribution network 10 may also include semi-regional facilities 106a and 106b (e.g., sectional center facilities) and regional facilities 108a and 108b (e.g., network distribution centers or distribution hubs).

The unit delivery facilities 104a and 104b may correspond to a facility that receives and delivers items destined to recipients within a given geographic area. Customer service supervisors, carriers and clerks may work in the unit delivery facilities 104a and 104b. In some embodiments, the unit delivery facilities 104a and 104b may also sort items before delivery. While customer service supervisors generally work in the unit delivery facilities 104a and 104b, mail processing supervisors and operators may also work in the unit delivery facilities 104a and 104b, for example, when the unit delivery facilities 104a and 104b have the capability to sort items before delivery. Carriers may pick up items from the unit delivery facility 104b and deliver the items to the recipients 101. In some embodiments, carriers may also pick up items from the shippers 102 and drop them off at the unit delivery facility 104a. Truck drivers may move items between the unit delivery facilities 104a and 104b, and the semi-regional facilities 106a and 106b. Truck drivers may also move items between the semi-regional facilities 106a and 106b, and the regional facilities 108a and 108b.

In the case of the USPS, the unit delivery facilities 104a and 104b may be associated with a region covered by a ZIP Code™ (a trademark of the USPS). In these embodiments, the unit delivery facilities 104a and 104b may receive items from the semi-regional facility 106a that serves it. These items received from the semi-regional facilities 106a and 106b may be delivered by the unit delivery facilities 104a and 104b (e.g., via a mail carrier route, etc.) to the appropriate destination within its covered geographic area. Accordingly, as discussed above, the unit delivery facilities 104a and 104b may also sort and stage the items intended for delivery to destinations/recipients within the delivery unit's coverage area.

The unit delivery facilities 104a and 104b may also serve to induct items into the distribution network 10. When serving as an intake facility, items that are inducted at the unit delivery facilities 104a, 104b into the distribution network 10 may be sent to the semi-regional facilities 106a and 106b. In some embodiments, the unit delivery facilities 104a and 104b may receive items from local shippers, from semi-regional facilities 106a and 106b, or regional facilities 108a and 108b. While the delivery unit 104a is shown as the intake facility, any of the semi-regional and regional facilities 106a and 106b, and 108a and 108b, respectively, or other facilities not shown, may serve as the intake facility.

The semi-regional facilities 106a and 106b may receive and distribute items between multiple unit delivery facilities 104a and 104b and the associated regional facilities 108a and 108b. In the case of the USPS, the semi-regional facilities 106a and 106b may each be associated with a geographic region covered by the first three numbers of a ZIP code. The semi-regional facility 106a may serve as a processing and distribution center for the respective multiple unit delivery facilities 104a and 104b within its respective geographic areas. In some embodiments, the semi-regional facility 106a may receive items from the regional facility 108a for distribution to its respective delivery unit 104a. In some embodiments, the semi-regional facility 106a may receive items from its delivery unit 104a, for distribution to other delivery units 104b or the regional facility 108a. Mail processing supervisors may work with operators in the semi-regional facilities 106a and 106b.

The regional facilities 108a and 108b may receive and distribute items between multiple semi-regional facilities 106a and 106b and other regional facilities. In the case of the USPS, the regional facility 108a may be associated with a region covered by a state or a group of states, etc. The regional facilities 108a and 108b may serve as processing and distribution centers for the respective multiple semi-regional facilities 106a and 106b within their respective geographic areas. In some embodiments, the regional facility 108a may receive items from the semi-regional facility 106a for distribution to another semi-regional facility 106b that the regional facility 108a serves. In some embodiments, the regional facility 108a may receive items from its semi-regional facilities 106a and 106b for distribution to other regional facilities, e.g., the regional facility 108b. Mail processing supervisors may also work with operators in the regional facilities 108a and 108b.

When the item enters the distribution network 10 at the intake facility (e.g., regardless of delivery unit 104a, semi-regional facility 106a, and regional facility 108a), the item may be scanned, routed according to intended destination, and tracked through all sortation and distribution steps through which the item may pass. In some embodiments, such tracking may be individual to the item or be aggregate for volumes of items. The tracking may occur until the item is delivered to its destined recipient or until the item leaves a delivery unit 104b for delivery to its destined recipient.

In some embodiments, the distribution network 10, as shown, may be a national distribution network 10 that includes multiple regional facilities 108a and 108b, multiple semi-regional facilities 106a and 106b, and multiple unit delivery facilities 104a and 104b, each having a defined coverage area, such as a geographic area and designated to receive and/or delivery items to/from recipients and senders in the geographic area.

As described herein, the distribution network 10 employed may comprise numerous pieces of mail processing equipment located in various facilities and at each level within the distribution network 10 (described and undescribed) that may scan identifiers on the items, take images of the items, interpret delivery point information from the scans or images of the items, automatically sort and route items according to the delivery point information indicated on the items, physical characteristics of the items, and/or postage characteristics. For example, these pieces of equipment identify delivery point information that is located on the items being processed and reference stored information associated with the identified delivery point information to assist in the sorting and routing of the item.

A processing facility can use automated processing equipment to sort items. Where the distribution network 10 is USPS, every day a processing facility receives a very high volume of items, such as letters and flats, which must be sorted and sequenced for delivery. Sorting and sequencing may be accomplished using automated sorting equipment which can scan, read, or otherwise interpret a destination end point from each item processed. The destination end point may be encoded in a computer readable code, such as a bar code printed on or affixed to the item. In some embodiments, the destination end point may be read by taking an image of the item and performing an optical character recognition (OCR) process on the image, and determining the delivery end point from the OCR'd address. In some embodiments, the automated sorting equipment at processing facilities can apply a computer readable code that encodes the delivery end point and may print or spray the computer readable code onto the item. In some embodiments, the processing facility uses sorting/sequencing apparatuses which can process about 30,000 items per hour. A typical unit delivery facility, such as a post office, may serve about 200 or more delivery routes, each with multiple delivery end points. In some embodiments, the deliveries are along fixed routes to which a delivery resource, such as a carrier may deliver items every day or at other periodicity.

An address block, postage indicia, a sender identifier, and barcodes in an item or a label have historically been identified in an image of an item using time and resource intensive methods such as OCR. Address block and barcode detection based on OCR processes can be time consuming and requires a large memory space and more processor resources for processing OCR images. Various embodiments provide a system and method for more efficiently and accurately detecting an address block and barcode on a captured image of an item, and reading the detected barcode using machine-learning based connected component analysis.

Although certain types of barcodes are described in this disclosure, various embodiments can be applied to other types of barcodes including, but not limited to, one-dimensional barcode types (e.g., UPC barcode, EAN barcode, Code39 barcode, Code 128 barcode, ITF barcode, Code 93 barcode, Codabar barcode, GS1databar barcode and MSI Plessey barcode) and two-dimensional barcodes (e.g., QR code, Datamatrix code, PDF417 code and Aztec code). Furthermore, although various embodiments are described with reference to an item barcode that is placed on a mail or an item for delivery, the present disclosure is not limited thereto and can be applied to non-mail barcodes (e.g., barcodes placed on products for sale, exhibit, or advertisement, etc.). Moreover, although various embodiments are described with reference to mail barcodes for USPS, the present disclosure is not limited thereto and can be used by other entities that make or ship products containing barcodes.

Figure 2A:
FIG. 2A illustrates an example of an item that contains an address block and barcode according to some embodiments.

FIG. 2A illustrates an example image showing an item 20 that contains an address block and a barcode according to some embodiments. The item 20 may include a barcode 210, a sender section 220, a recipient section 230 and a postage indicia section 240. At least one of the sender section 220 or the recipient section 230 may form an address block. The item 20 shown in FIG. 2A is merely an example item, and certain elements may be modified or removed, and/or other elements or equipment may be added. For example, although the item 20 of FIG. 2A contains only one barcode, it can also include two or more barcodes depending on the embodiments. In some embodiments, an address block may include both a delivery location, such as an address, and a barcode. Furthermore, although FIG. 2A shows a letter type item, other types of items, such as parcels, flats, and the like can also be used. The item 20 may be processed by the system shown in FIG. 3 or 4.

The barcode 210 may be an Intelligent Mail® barcode (IMb) and/or an Intelligent Mail® package barcode (IMpb). The IMb and IMpb are barcodes that can be read by automated parcel processing equipment and scanning devices using processes described herein. The IMb is generally a 4-state barcode using 65 bars to encode information according to the IMb specification. The IMpb includes a data string that generally follows the GS1-128 specification. In some embodiments, the IMb and IMpb may include a variable length format that is determined by the elements selected by the sender, and supply tracking and routing data for packages and extra service applications. The IMb and IMpb may be used on distribution items, such as business mail, flats, letter mail, commercial mail and packages, parcels, and on other items of customers requesting extra services. The barcode 210 may also include other types of computer readable codes described above.

Figure 2B:
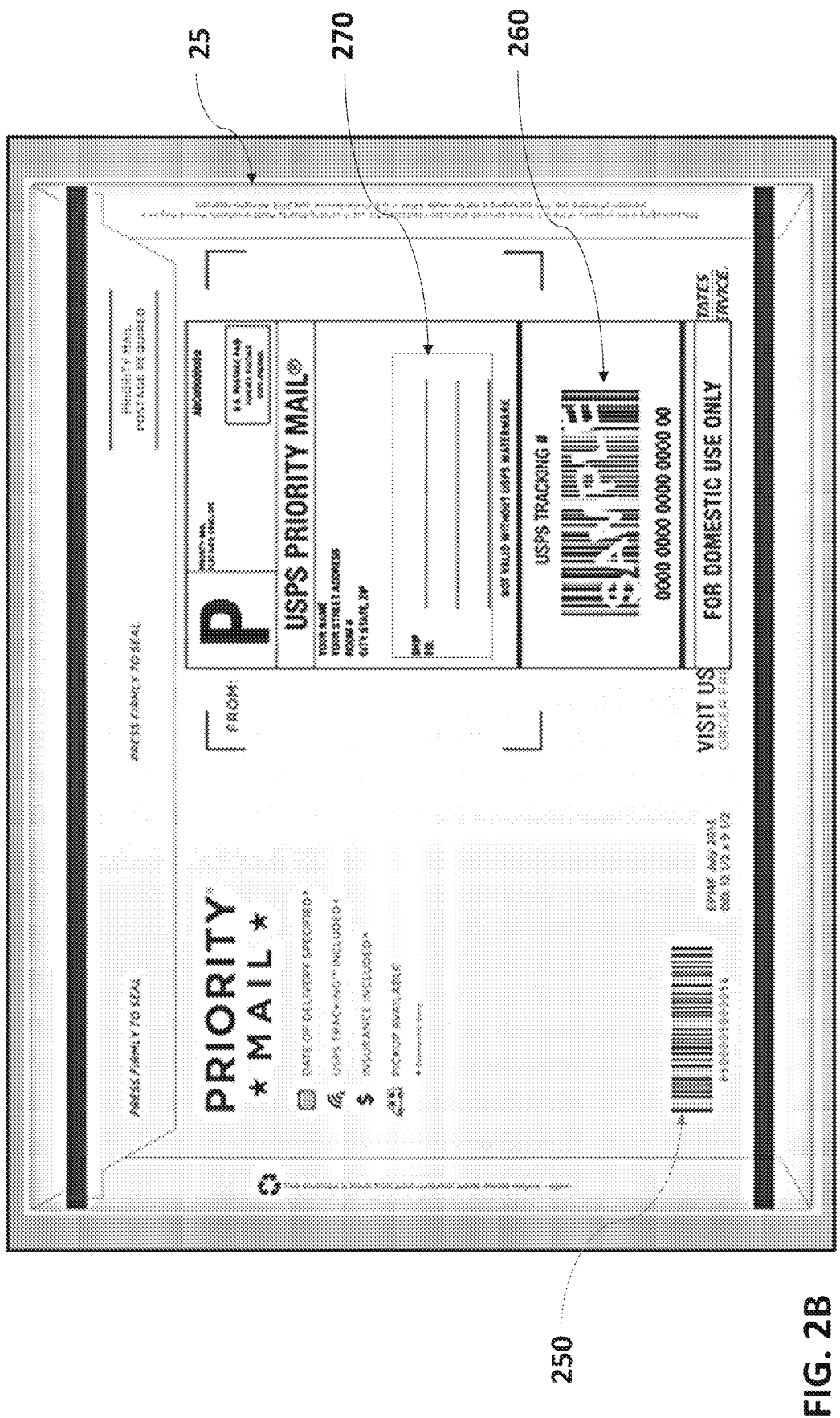
FIG. 2B illustrates an example image showing a label that contains barcodes according to some embodiments.

FIG. 2B illustrates an example image showing a label 25 that contains barcodes 250 and 260, and an address block 270 according to some embodiments. Although FIG. 2B shows that the address block 270 includes no address, the address block 270 may include a destination address or other delivery point identifier. The label 25 shown in FIG. 2B is merely an example label, and certain elements may be modified or removed, and/or other elements or equipment may be added. For example, although the label 25 of FIG. 2B contains two barcodes, it can also include a single barcode or three or more barcodes depending on the embodiments. The label 25 may be a printed label and include sorting, processing, and routing information such as recipient mailing address, sender address, class of service, tracking number, postage payment, etc. The label 25 may be processed by the system shown in FIG. 3 or 4.

Figure 3:
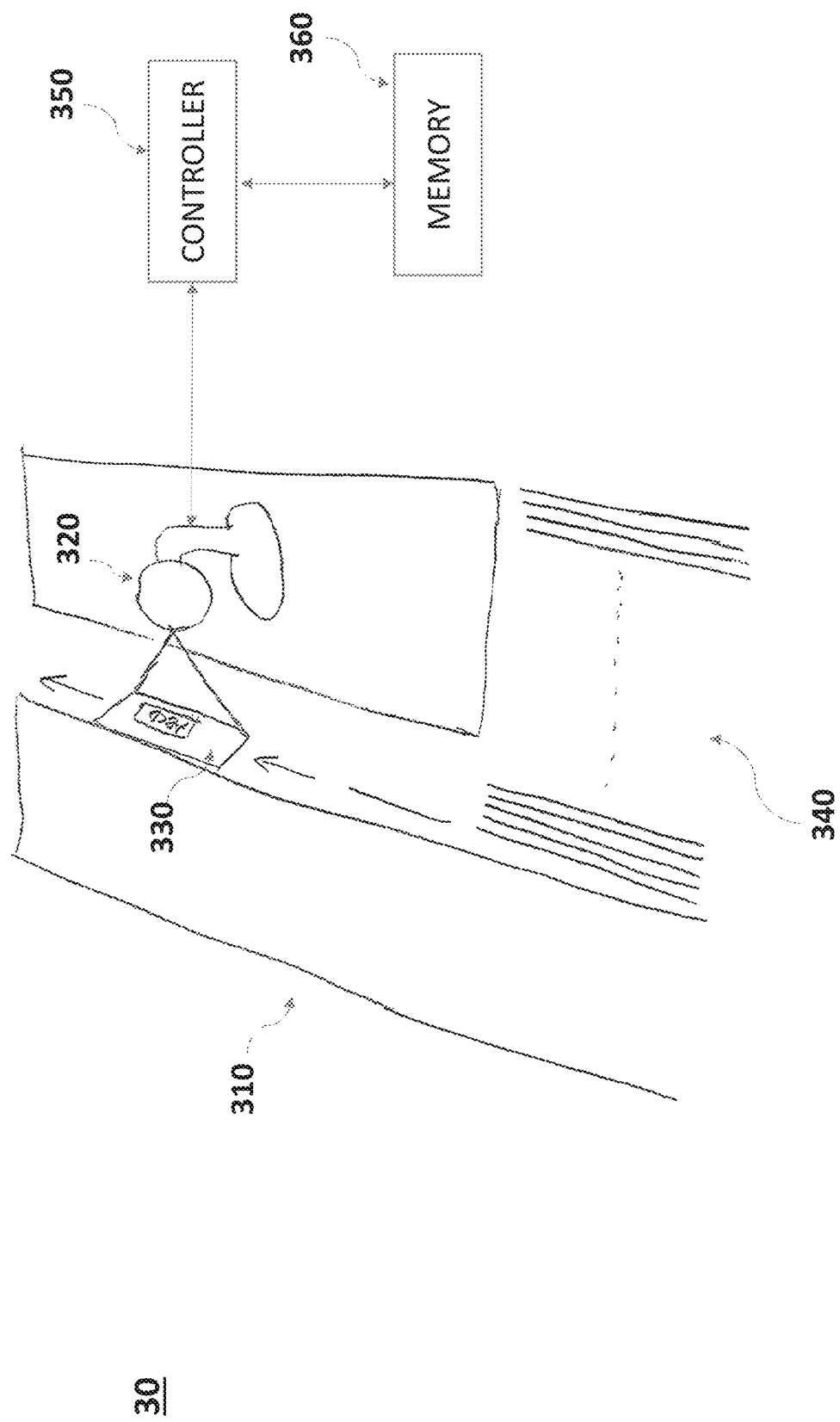
FIG. 3 illustrates an item processing system for detecting an address block and barcode on a captured image of an item, and reading the detected barcode according to some embodiments.

FIG. 3 illustrates an item processing system for detecting an address block and barcode on a captured image of an item, and reading the detected barcode according to some embodiments. The item processing system 30 may include processing equipment 310, an optical scanner (or a reader) 320, a controller 350 and a memory 360. The item processing system 30 shown in FIG. 3 is merely an example processing system, and certain elements may be modified or removed, and/or other elements or equipment may be added. Although only one optical scanner is shown in FIG. 3, two or more optical scanners can be provided depending on the embodiment.

The processing equipment 310 may include an automated letter sorting machine used for letter-size mails that are barcoded. The processing equipment 310 may include a conveyor belt, pinch wheels, vacuum backed drive belts or other mechanisms, and the like (not shown) that move items from one location to another. Although FIG. 3 shows that the imaging device 320 scans letters or flat items being conveyed by the processing equipment 310, the imaging device 320 can also scan items such as parcels, residual mail, and the like. In some embodiments, the processing equipment can be a delivery barcode sorter (DBCS), a high speed sorter, a parcel sorter, or other type of sorting or processing apparatus.

The processing equipment 310 may automatically sort items 340 by conveying each of them past an imaging device 320 that captures an image of an item 330 that is being conveyed. The imaging device 320 may capture an entirety or a portion of one side of the item 330 facing the scanner 320. The imaging device 320 may capture information relevant to processing and/or delivery such as names and addresses of senders and recipients, postage and barcodes, etc. The barcodes may include an IMb, an IMpb or other barcodes described above. The imaging device 320 can be a camera, a scanner, a laser device, or other type of imaging device. The imaging device 320 can output a digital image in color, grayscale, black and white, or binarized data. In some embodiments, the imaging device 320 can capture an image, and can convert the image to binarized data or to another data format.

The imaging device 320 may continuously and separately capture images of items being transported in front of the scanner 320. In some embodiments, the imaging device 320 or a connected processor may convert the captured images into digital data, such as binary data. In some embodiments, the imaging device 320 may send the captured images to the controller 350 so that the controller 350 may convert the received captured images into binary data. In some embodiments, the controller 350 may receive color, grayscale, or black and white image data. The controller 350 can convert the color or grayscale image to a black and white image, and then can convert the image to binary data.

In some embodiments, the captured images or digital data thereof may be stored in the memory 360. In some embodiments, the captured images or digital data thereof may be stored in a memory of the scanner 320 or a memory of the controller 350. The imaging device 320 may be connected to the controller 350 either by wire or wirelessly. In some embodiments, the captured images or digital data thereof may be stored in a network memory such as a cloud or other device separately located from the elements 320, 350 and 360. The captured images or digital data thereof may also be transmitted to a receiving device via a communication network (wired or wireless). The digital data may include binary data. For example, "0" represents a white pixel and "1" represents a black pixel, or vice versa. Hereinafter, for the purpose of convenience, binary data will be described as an example of digital data.

In some embodiments, at least one of the scanner 320 or the controller 350 may detect an address block and barcode on a captured image of an item, and read the detected barcode. For example, at least one of the scanner 320 or the controller 350 may identify and process binary data of the captured image of the item so as to detect an address block and barcode on a captured image of an item, and read the detected barcode. At least one of the scanner 320 or the controller 350 may detect the address block and barcode, and read the detected barcode using the flow diagrams shown in FIGS. 6, 8, and 10 (to be described in greater detail with respect to FIGS. 6, 8, and 10 below). However, at least one of the scanner 320 or the controller 350 may detect the address block and barcode, and read the detected barcode in other ways.

Figure 4:
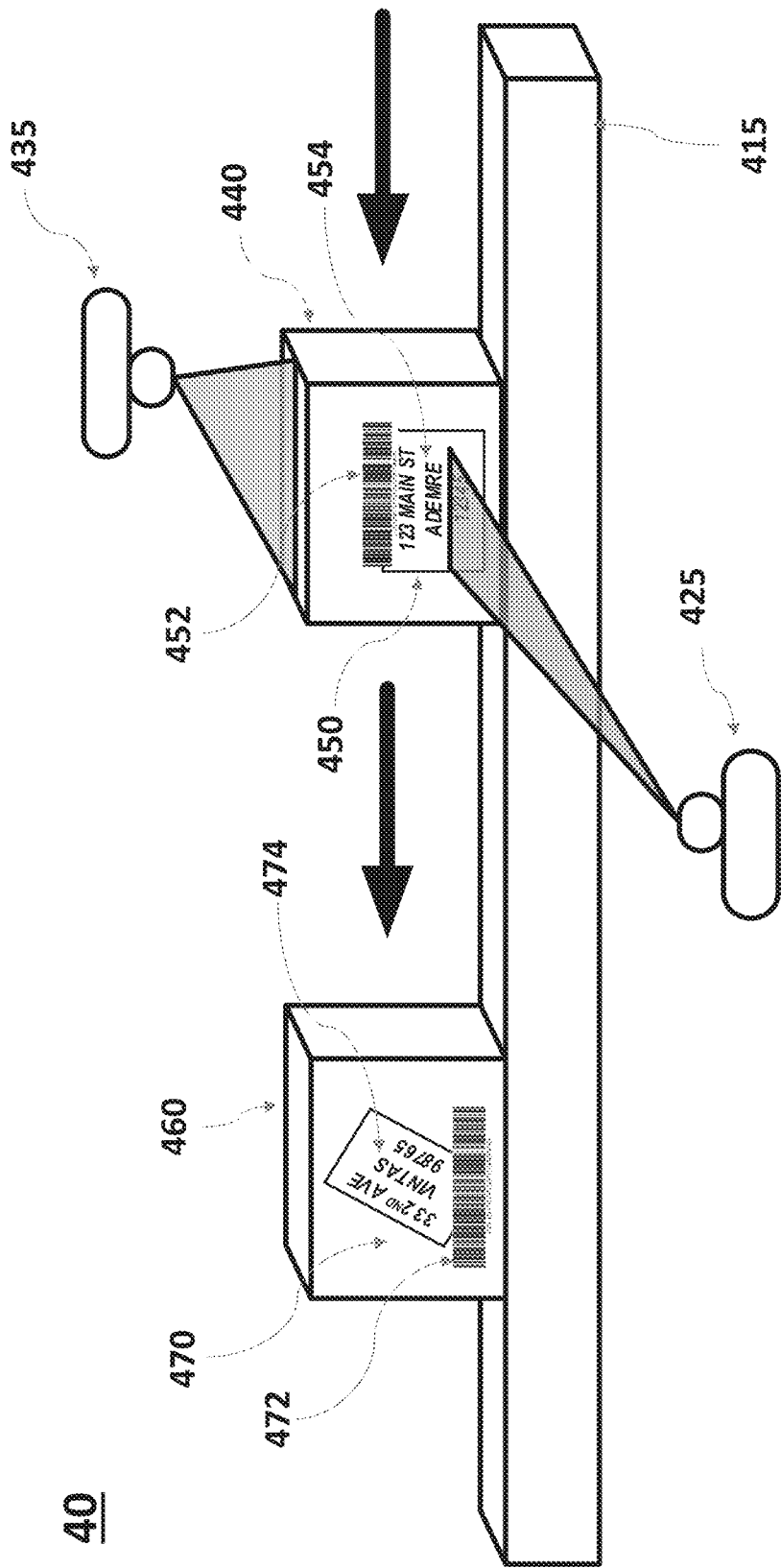
FIG. 4 illustrates another item processing system for detecting an address block and barcode on a captured image of an item, and reading the detected barcode according to some embodiments.

FIG. 4 illustrates another item processing system 40 for processing items such as parcel items containing one or more barcodes according to some embodiments. The item processing system 40 may include a conveyor 415, a front scanner 425 and an upper scanner 435, or may comprise either a front scanner 425 or an upper scanner 435. The position of the scanners 425 and 435 may be altered or changed without departing from the scope of the present disclosure. The conveyor 415 conveys parcels including a parcel 440 and a parcel 460. The front scanner 425 may scan a label 450 of the parcel 440 containing a barcode 452 and an address block 454 and disposed on the front side of the parcel 440. The front scanner 425 may also scan a label 470 of the parcel 460 containing a barcode 472 and an address block 474 and disposed on the front side of the parcel 460. The upper scanner 435 may scan a label (not shown) containing a barcode and disposed on the top surface of the parcel 440 or 460. For the purpose of convenience, a controller and a memory are omitted in FIG. 4.

Although FIG. 4 shows that all of the labels/codes/text (450, 452, 454, 470, 472, 474) are provided on the same side of the parcel or item 440 or 460, the present disclosure is not limited thereto. For example, at least one of the labels/codes/text (450, 452, 454, 470, 472, 474) can be provided on another different side of the parcel or item 440 or 460. Furthermore, although two barcodes (452, 472) and one machine readable text 454/474 are provided on the item 440/460 in FIG. 4, more or less codes/text can also be provided depending on the embodiment.

Figure 5:
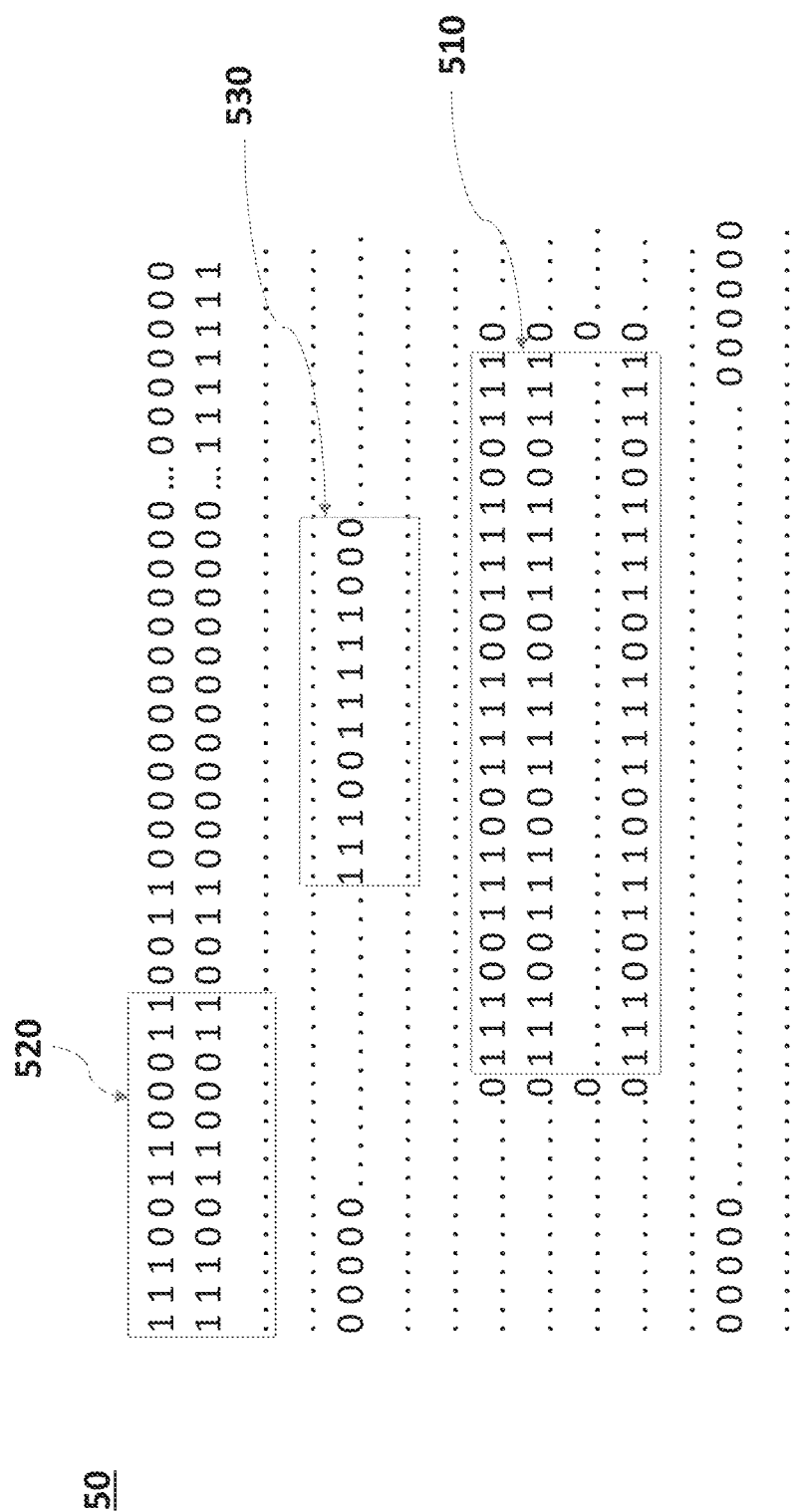
FIG. 5 shows example binary data representing a captured image of an item or a label according to some embodiments.

FIG. 5 shows example binary data 50 representing a captured image of an item or a label according to some embodiments. Binary image data may be obtained by binarizing a captured image to binary data, for example, by converting a color image to black and white, or to grayscale, and binarizing the resulting pixels with a value of "0" or "1". The example set of binary data 50 may represent a label such as a label 20 shown in FIG. 2A that contains the address block (220/230) and the barcode 210. The binary data 50 may include a combination of a white pixel and a black pixel. The white pixel may be represented by "0" and the black pixel may be represented by "1." In grayscale, a white pixel, or a pixel over a certain brightness or gray value, may be represented by "0", and a black pixel, or a pixel under a certain brightness or gray value may be represented by "0". As illustrated in FIG. 5, for convenience, dots can represent either zeros or ones. The black pixel may represent a black image, text, handwritten characters, scribbling, and/or bars in the image, and pixel value "0" may represent a background and space between adjacent bars in the image. FIG. 5 is merely an example set of binary data and other configuration of binary data may also be used.

The systems and processes described herein may detect a barcode represented by a set of pixel values 510 and an address block represented by a set of pixel values 520 and a set of pixel values 530. The pixel values 510-530 are merely examples, and other values are also possible. Each of the barcode and the address block may have a dimension of horizontal length and a vertical length. In these embodiments, the set of pixel values 510-530 may have a horizontal pixel number corresponding to the horizontal length of the barcode and a vertical pixel number corresponding to the vertical length of the barcode. The memory 360 may store pixel number information for the binary data 50 and the pixel sets 510-530. The memory may also store a ratio of the horizontal and vertical pixel numbers of the binary data 50 to those of each of the pixel sets 510-530. When the sets of pixel values 510-530 are identified, the location of the sets of pixel values 510-530 can be compared to or combined with the image data to act as a mask or filter, and only the image data in the location of the image corresponding to the sets of pixel values 510-530 can be passed to a barcode parser or decoder.

Address Block Detection

Figure 6:
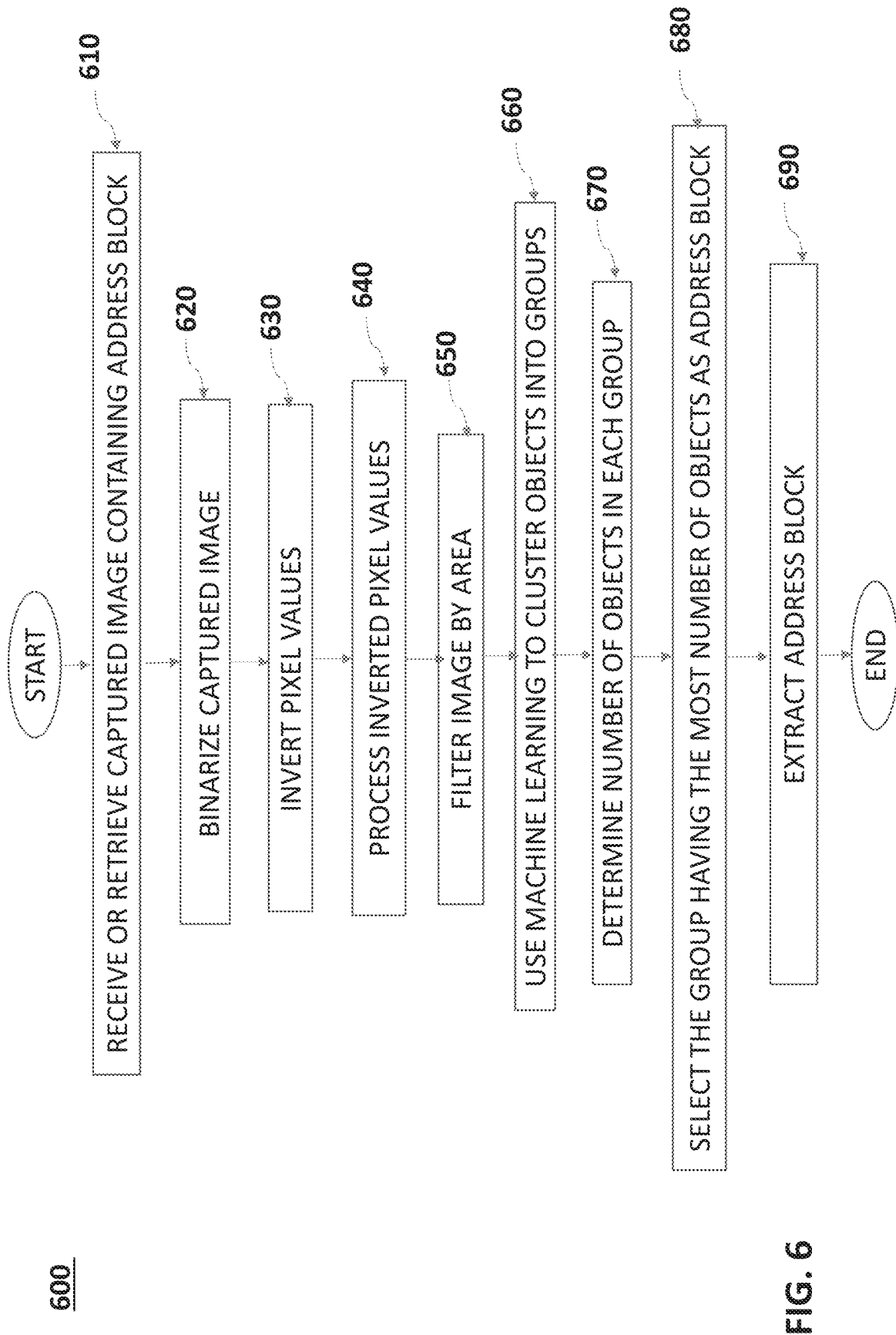
FIG. 6 is a process flow diagram of a method for detecting an address block on a captured image of an item according to some embodiments.

FIG. 6 is a process flow diagram 600 of a method for detecting an address block on a captured image of an item according to some embodiments. FIGS. 7A-7H are diagrams for explaining the process flow diagram of FIG. 6. In some embodiments, the process flow diagram 600 may be performed by at least one of the optical scanner (320/425/435) or the controller 350. In some embodiments, the process flow diagram 600 may be performed by another computing device separate from and/or in data communication with at least one of the optical scanner (320/425/435) or the controller 350. For the purpose of convenience, the embodiments of FIGS. 6 and 7A-7H will be described based on the controller 350 performing the process flow diagram 600. Although the process flow diagram 600 is described herein with reference to a particular order, in various embodiments, states herein may be performed in a different order, or omitted, and additional states may be added.

Referring to FIG. 6, in state 610, the controller 350 may receive or retrieve a captured image of an item or a label containing an address block. The controller 350 may receive the captured image from a scanner such as one or more scanners 320, 425 or 435 shown in FIG. 3 and FIG. 4. The controller 350 may also retrieve the captured image from a memory such as the memory 360 shown in FIG. 3.

Figure 7A:
FIGS. 7A-7H are diagrams for explaining the process flow diagram of FIG. 6 according to some embodiments.

An example of the captured image 710 is shown in FIG. 7A. The captured image 710 may include an address block 712 and a barcode 714. The captured image 710 of the item shown in FIG. 7A is merely an example, and certain elements may be modified or removed, and/or other elements or equipment may be added. Furthermore, arrangement, configuration, color, and shape of components of the item are also examples and others are also possible. For example, although FIG. 7A contains only one barcode 714, it can also include two or more barcodes depending on the embodiments. Furthermore, a different type of barcode can also be provided. Moreover, although FIG. 7A shows that the address block 712 is positioned on a lower right portion of the captured image 710, it can be placed in other regions (e.g., around the middle, top right, top left, bottom, etc.). At least one of the address block 712 or the barcode 714 may be printed on the item or attached to the item. The captured image 710 shown in FIG. 7A may be a grayscale image, however, the present disclosure is not limited thereto.

Figure 7B:
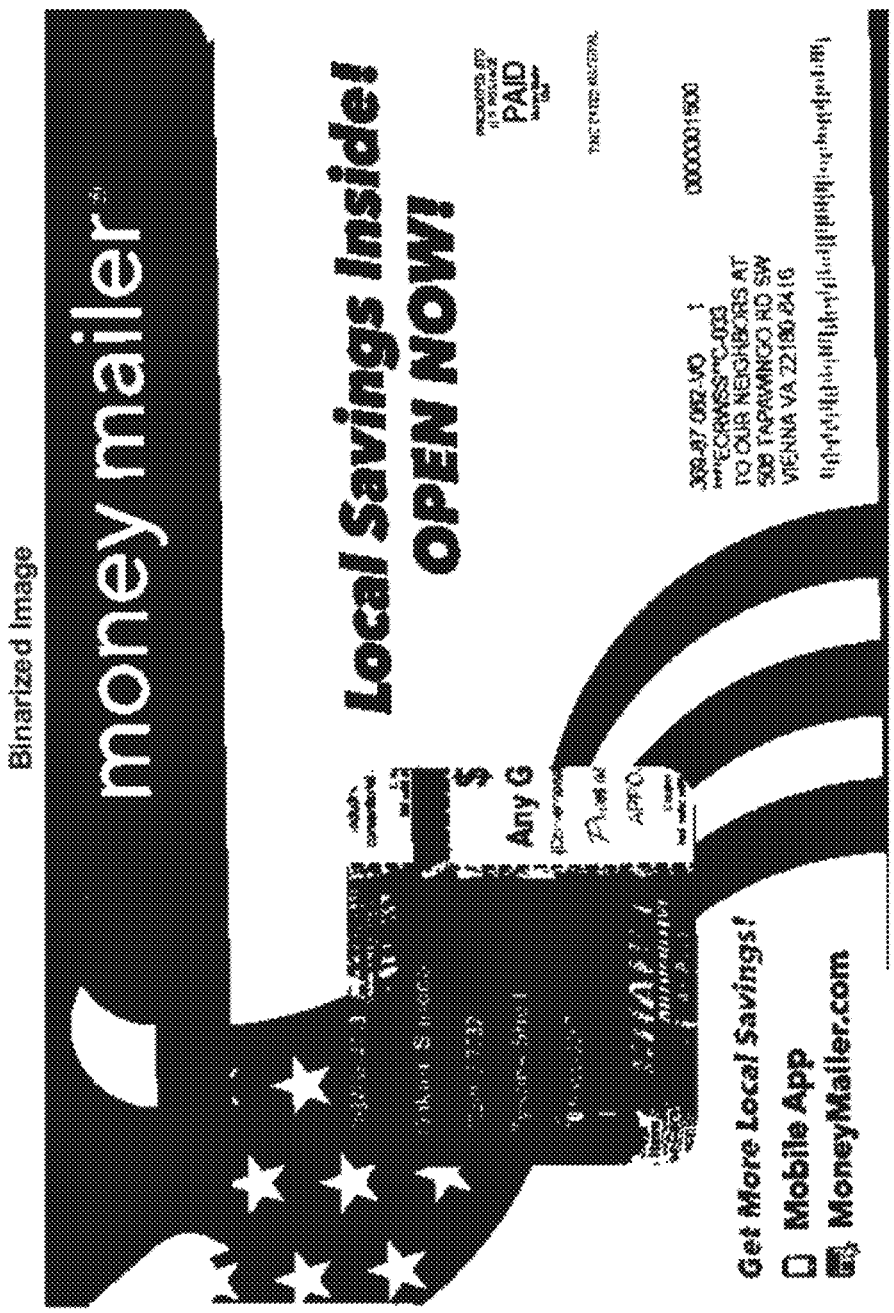
Figure 7C:
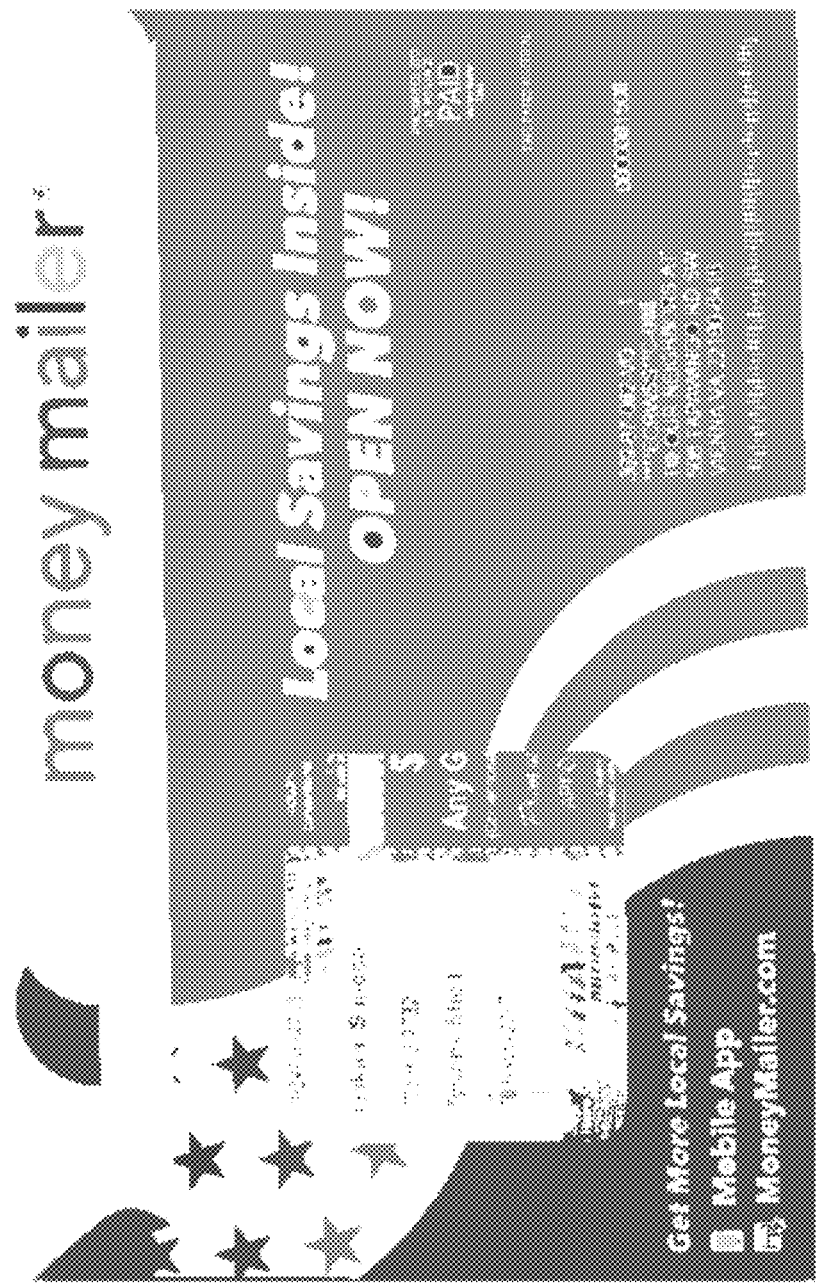

In state 620, the controller 350 may binarize the received or retrieved captured image. An example of the binarized image 720 is shown in FIG. 7B. Although the FIG. 6 embodiment shows that the controller 350 receives or retrieves the captured image in an analog form, and binarizes the received or retrieved image, the present disclosure is not limited thereto. For example, the controller 350 may receive the binarized captured image from the scanner (320, 425 or 435) or retrieve the binarized captured image from the memory 360. In these embodiments, one or more of the scanners (320, 425 or 435) may capture an image of an item and convert the captured image into binary data. The binarized captured image may be stored in the memory 360. The step of binarizing the captured image may be omitted, and one of skill in the art would understand that the binarizing step can be optionally included or excluded.

In state 630, the controller 350 may invert pixel values of the binarized image to analyze relevant information effectively. The controller 350 may invert the pixel values by switching pixel values, e.g., from 0 to 1, or 1 to 0. In some scenarios, white pixels are identified by ones, however, most information (e.g., text such as address block) to be analyzed by the controller 350 may be black. In these scenarios, when the controller 350 processes the binarized image as is, then, the controller 350 may not be able to process relevant information effectively (see, e.g., the image 730 of FIG. 7C).

Figure 7D:
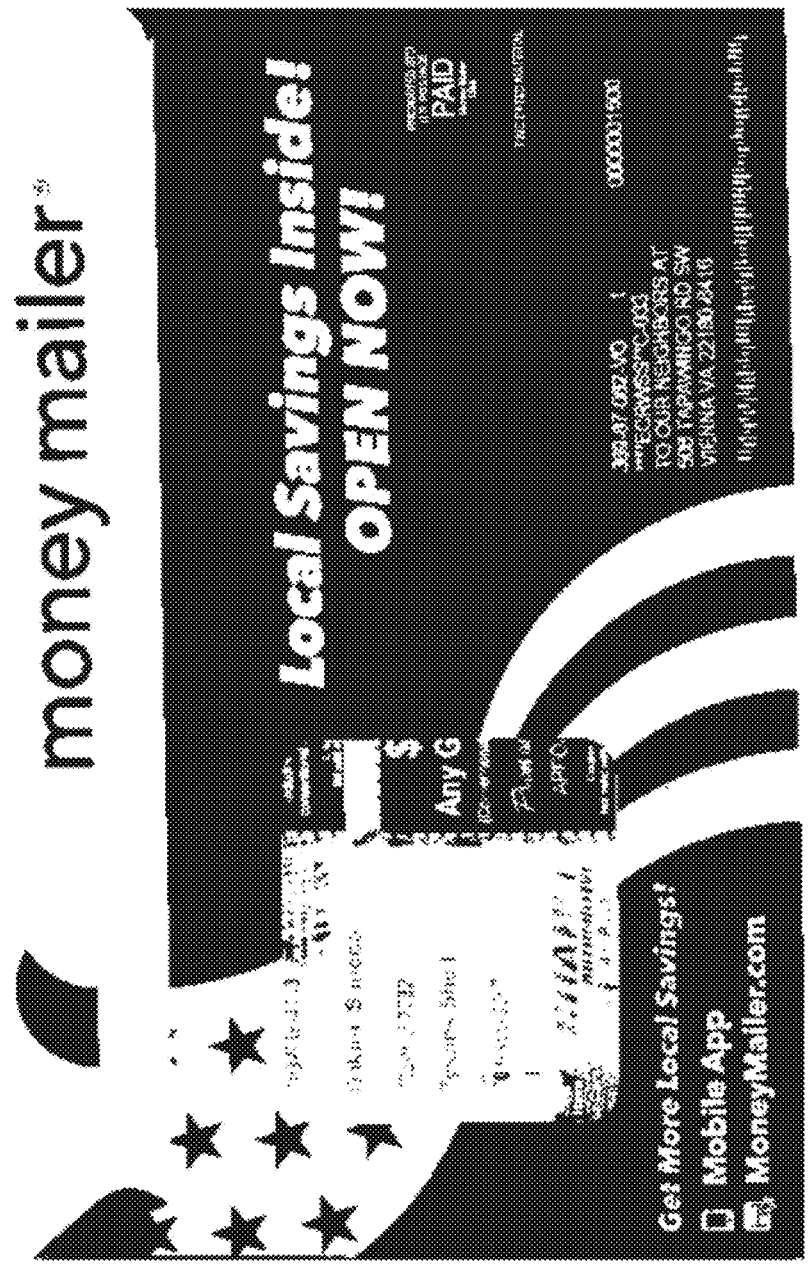
Figure 7E:
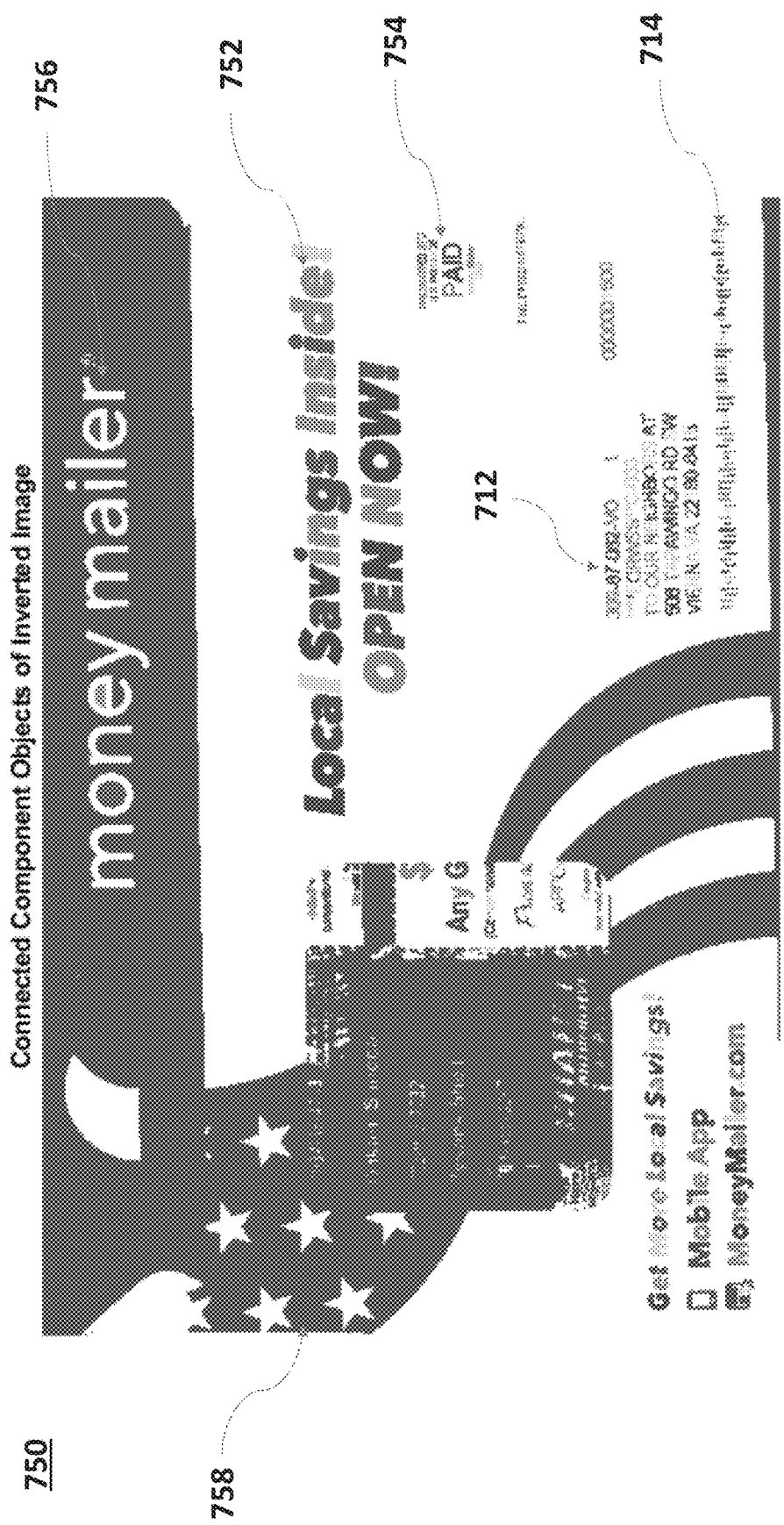

An example of an inverted image 740 is shown in FIG. 7D. Another inverted image 750 is shown in FIG. 7E where connected component objects including (but not limited to) a promotion label 752, a postage 754, a title label 756, a picture element 758, an address block 712, and a barcode 714 are more distinctively shown on the inverted image 750. By inverting the pixel values of the binarized image, the controller 350 can process most relevant information (e.g., address block) more effectively. In some embodiments, the controller 350 may invert the logical array by assigning a new matrix to the "not" of the current image essentially inverting the pixel values. In some embodiments, state 630 may be omitted and the controller 350 may not binarize the image.

In state 640, the controller 350 may process the pixel values of the binarized image (FIG. 7E). Compared to the image 730 shown in FIG. 7C, the controller 350 may process the inverted pixel image 740 shown in FIGS. 7D and 7E where relevant text information is more clearly identified by the controller 350.

Figure 7F:
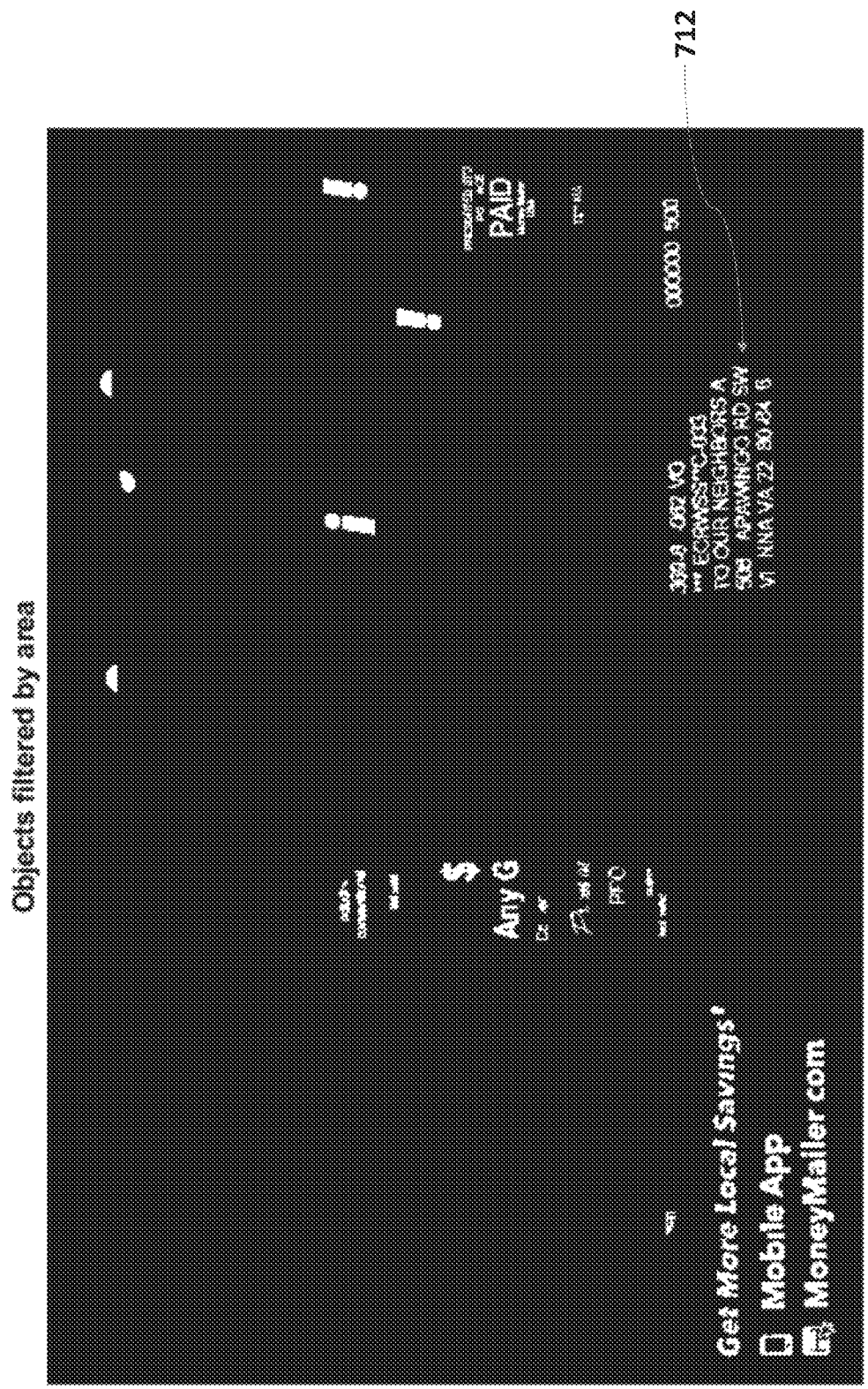

In state 650, the controller 350 may filter the processed inverted image by area. FIG. 7F shows an example image 760 showing objects that have been filtered by area. One common use of component analysis is using the properties of the components to help filter or mask some of the features in an image. In one example, the controller 350 may remove certain large items, such as elements 752, 756, and 758 shown in FIG. 7E, from the image 750 to help focus on a specific area of interest such as the address block 712 shown in FIG. 7F. In some embodiments, the controller 350 may filter the components to a given range of sizes where all components outside of the minimum and maximum ranges are removed from the image. These range can be fine-tuned to meet the needs of a specific use case, and may be predetermined for various types of items, for example, when an item is a standard-type item, and the information on the item or label is generally located in the same location in images of the item. In some embodiments, this step may be optional, and filtering images by area may not be performed. In some embodiments, the controller 350 may start with a range that filters out most of the non-address block data such as the elements 752, 756, and 758 shown in FIG. 7E while still retaining a majority of the address block (712 in FIG. 7F). The property "area" is has easily calculated properties and represents the number of pixels included in this component. The controller 350 may filter the processed inverted image by area using, for example, the following MATLAB function (Function #1). However, the present disclosure is not limited thereto.

Function #1
    rangeMin=20;
    rangeMax=180;
    imf=bwareafilt(imbwinv,[rangeMin,rangeMax]);
    imshow(imf)
    title("Objects filtered by area")

Figure 7G:

In state 660, the controller 350 may use machine learning on the processed inverted image to cluster objects in the filtered image into groups. The controller 350 may perform machine learning using the filtered image (FIG. 7F). FIG. 7G shows an example image 770 containing objects filtered by cluster. The objects in the filtered image may include an address block 712, a barcode 714, a postage 754, and other labels 752/756/772, and a picture element 758. In performing the machine learning, the controller 350 may locate group objects in the processed or filtered image to identify the address block 712 in the image. As an address block generally includes a large grouping of characters, the controller 350 may use an unsupervised machine learning algorithm to cluster the objects into groups. In some embodiments, the controller 350 may use a density-based spatial clustering of applications with a noise (DBSCAN) algorithm. The DBSCAN algorithm may use three variables (X, epsilon, minpts) and may partition or cluster observations in the n-by-p data matrix X into clusters based on a threshold for a neighborhood search radius epsilon and a minimum number of neighbors minpts required to identify a core point. The function may return an n-by-1 vector (idx) containing cluster indices of each observation. The controller 350 may cluster objects in the filtered image into groups using, for example, the following MATLAB function (Function #2). However, the present disclosure is not limited thereto.

| Function #2 |
|---|
| epsilon =25;<br>minpts = 10;<br>ccStats.Group = dbscan(ccStats.Centroid,epsilon,minpts);<br>if max(ccStats.Group) < 0<br>   disp("Warning: No groups detected")<br>end<br>grps = unique(ccStats.Group);<br>grps(grps == -1) = [ ];<br>imDisp = im;<br>cmap = colormap("prism");<br>for gi = 1 : numel(grps)<br>   grpData = ccStats(ccStats.Group == gi,:);<br>   cData = vertcat(grpData.PixelList{:});<br>   for pxi = 1 : size(cData,1)<br>    pxl = cData(pxi,:);<br>    imDisp(pxl(2),pxl(1),1) = cmap(gi,1)*255;<br>    imDisp(pxl(2),pxl(1),2) = cmap(gi,2)*255;<br>    imDisp(pxl(2),pxl(1),3) = cmap(gi,3)*255;<br>   end<br>end<br>imshow(imDisp)<br>title("Filtered Objects by Cluster") |

To cluster the objects in the image based on location, the controller 350 may use one or more of the properties of the connected components that relate to pixel locations, in many cases using the centroids of the objects is enough to perform this type of clustering. The controller 350 may identify barcodes (to be described in greater detail) by using information about, for example, the width, height, or orientation of the objects being clustered.

In some embodiments, the DBSCAN algorithm may cluster data into n groups with the size of n not predetermined. This method is useful when the number of groups is unknown. It should also be noted that not all elements are assigned to a group as any observation considered to be an outlier is classified as group -1 and can later be filtered if needed. In addition to the input data two parameters also need to be provided:

epsilon—Epsilon neighborhood of a point, specified as a numeric scalar that defines a neighborhood search radius around the point. If the epsilon neighborhood of a point contains at least minpts neighbors, then DBSCAN identifies the point as a core point. The value of epsilon may be empty ([ ]) when D is a logical vector or matrix.

minpts—minimum number of neighbors required for a core point, specified as a positive integer. The epsilon neighborhood of a core point in a cluster may contain at least minpts neighbors, whereas the epsilon neighborhood of a border point can contain fewer neighbors than minpts.

The controller 350 may consider epsilon for the input data. In some embodiments, the size of epsilon may be easier to approximate as the data has few dimensions and is easy to conceptualize as it is 2D coordinate vectors with uniform scale. In these embodiments, epsilon can be thought of as the number of pixels to search in the x or y direction. If high dimensional data is being used, this value may require more experimentation to determine the optimal value.

minpts may be much easier to understand for many use cases as it is simply the minimum number of objects within Epsilon of each other to be considered for grouping. As an address block is expected to have a large grouping of characters within a close distance to each other, this can provide a good initial estimate of Epsilon and minpts It should also be noted that as a result of the low resolution and compression artifacts from the low quality JPEG, some of the characters' edges are joined resulting in physical joining and shared component labels. This may need to be considered as the minpts might be lower than initially expected by visual analysis of the image.

In some embodiments, when fine tuning to select just the address block through the above method on a single image does not provide robust detection across a variety of images, multiple images can be used for fine tuning. For example, there may be multiple images of the same item taken in an item processing or sorting apparatus which can be used to fine tune the detection. The controller 350 may perform some additional steps after DBSCAN to further detect the address block as described below.

In state 670, the controller 350 may determine the number of objects in each of the clustered groups by performing additional operations on the clustered objects to detect the address block. It is assumed that there are three clustered groups, where group number 1 has, for example, 10 objects, group number 2 has, for example, 36 objects and group number 3 has, for example, 10 objects. These group numbers and object numbers are merely examples and other numbers are also possible.

Figure 7H:
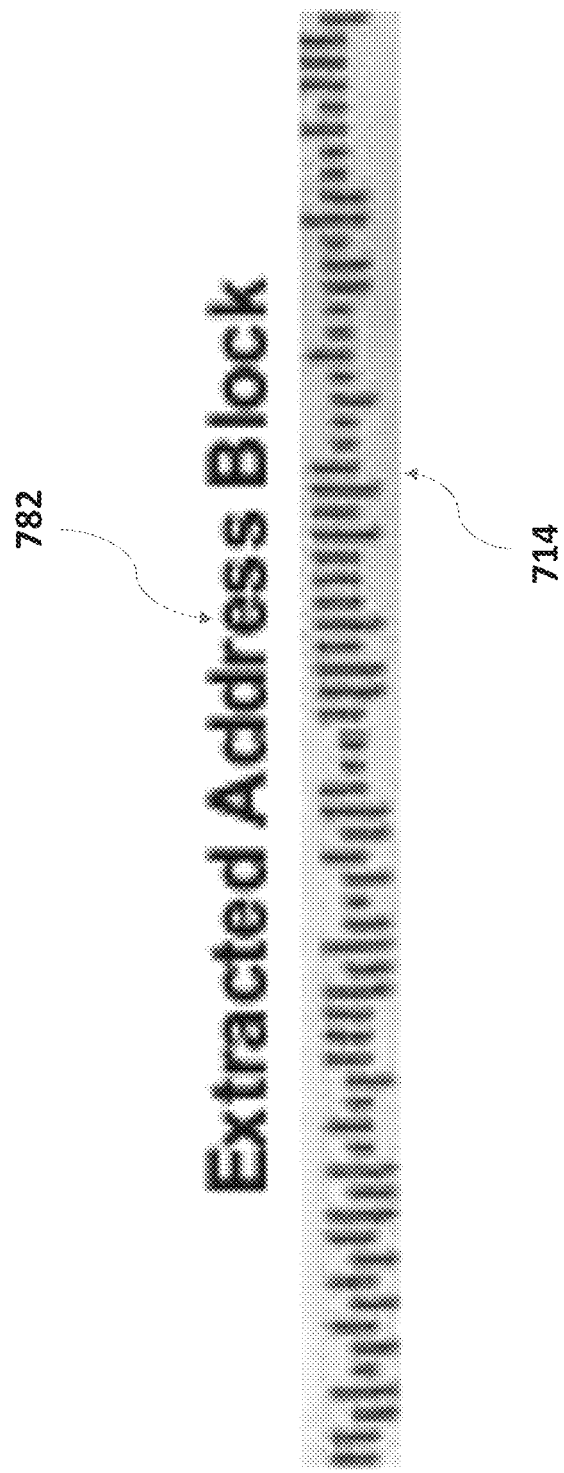

In state 680, the controller 350 may select the group having the most number or the greatest number of objects as an address block. For example, the controller 350 may select group 2 (36 objects) in the above scenario. In state 690, the controller 350 may extract the address block from the selected group. The extracted address block may be read using an OCR process or artificial intelligence (AI). The controller 350 may store the extracted address block in a memory. FIG. 7H shows an example extracted address block 782 representing the address block 712 (disposed above a barcode block 714).

In some embodiments, the controller 350 may select a group having a predetermined or threshold number of objects as a barcode. In these embodiments, the predetermined or threshold number of objects may be stored in a memory. In some embodiments, the controller 350 may select two or more groups in a predetermined number range of objects (e.g., 40-50, 50-60, 60-70, 50-70, etc.) and select the group having the most number of objects in the selected groups as a barcode. In these embodiments, the predetermined number range of objects may be stored in a memory.

The controller 350 may perform state 690 using, for example, the following MATLAB function (Function #3). However, the present disclosure is not limited thereto.
Function #3
   % Extract the data for our biggest group
   addBlockStats=ccStats(ccStats.Group==maxGroup,:);

```
% Calculate the bounding box for the overall group
addBlockPixelList=vertcat(addBlockStats.PixelList{:});
minX=min(bcPixelList(:,1));
maxX=max(bcPixelList(:,1));
minY=min(bcPixelList(:,2));
maxY=max(bcPixelList(:,2));
imAddBlock=img(minY:maxY,minX:maxX);
imshow(imAddBlock)
title("Extracted Address Block")
```

Barcode Detection

Figure 8:
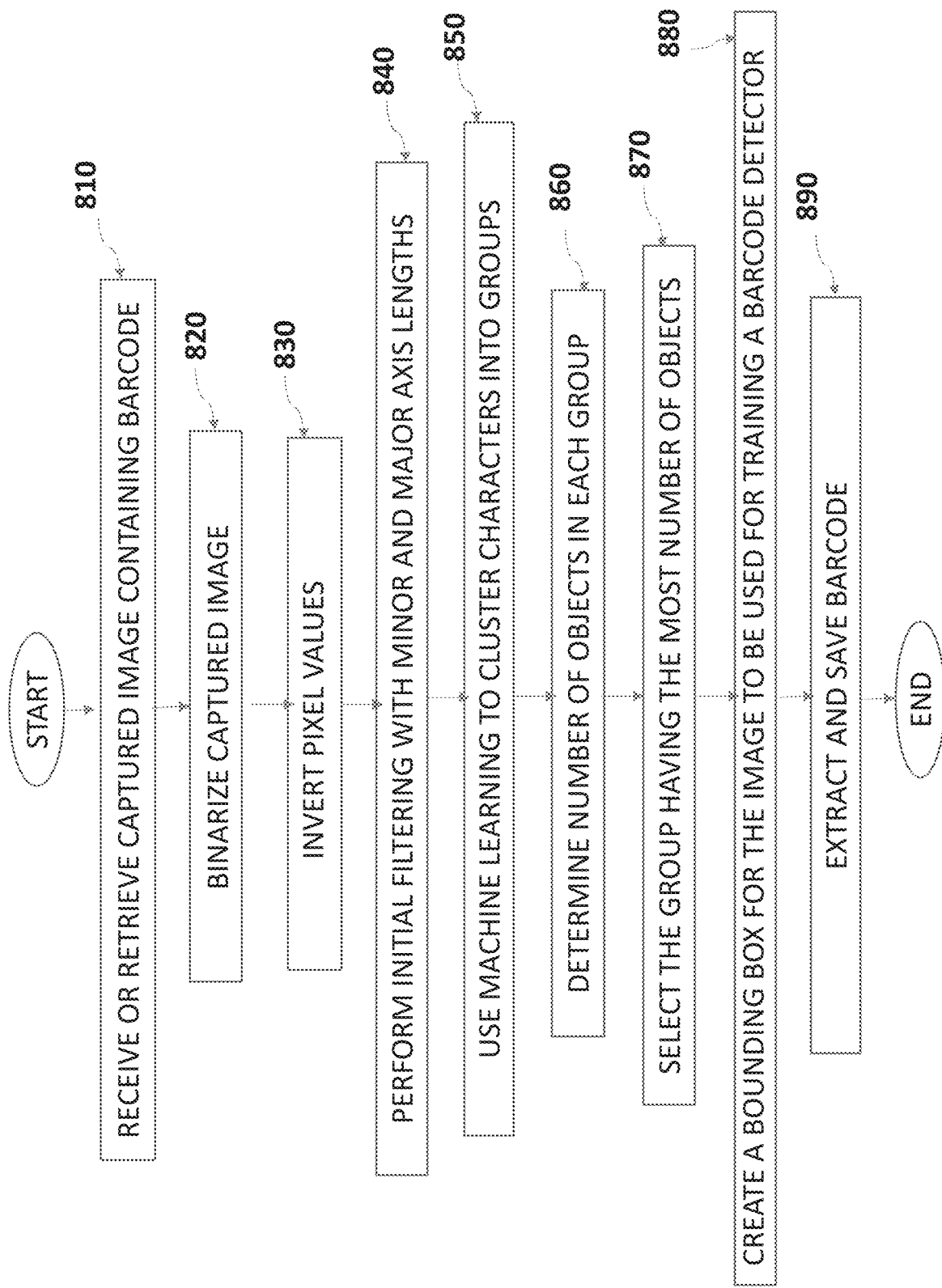
FIG. 8 is a process flow diagram of a method for detecting a barcode on a captured image of an item according to some embodiments.

FIG. 8 is a process flow diagram 800 of a method for detecting a barcode block on a captured image of an item according to some embodiments. FIGS. 9A-9F are diagrams for explaining the process flow diagram of FIG. 8 according to some embodiments. In some embodiments, the process flow diagram 800 may be performed by at least one of the optical scanner (320/425/435) or the controller 350. In some embodiments, the process flow diagram 800 may be performed by another computing device separate from and/or in data communication with at least one of the optical scanner (320/425/435) or the controller 350. For the purpose of convenience, the embodiments of FIGS. 8 and 9A-9F will be described based on the controller 350 performing the process flow diagram 800. Although the process flow diagram 800 is described herein with reference to a particular order, in various embodiments, states herein may be performed in a different order, or omitted, and additional states may be added.

Referring to FIG. 8, in state 810, the controller 350 may receive or retrieve a captured image of an item or a label containing a barcode. The controller 350 may receive the captured image from a scanner such as one or more scanners 320, 425 or 435 shown in FIG. 3 and FIG. 4. The controller 350 may also retrieve the captured image from a memory such as the memory 360 shown in FIG. 3.

Figure 9A:
FIGS. 9A-9F are diagrams for explaining the process flow diagram of FIG. 8 according to some embodiments.

An example of the captured image 812 is shown in FIG. 9A. The captured image 812 may include a barcode 814. The captured image 812 of the item shown in FIG. 9A is merely an example, and certain elements may be modified or removed, and/or other elements or equipment may be added. Furthermore, arrangement, configuration, color, and shape of components of the item are also examples and others are also possible. For example, although FIG. 9A contains only one barcode 814, it can also include two or more barcodes depending on the embodiments. Furthermore, a different type of barcode can also be provided. Moreover, although FIG. 9A shows that the barcode block 814 is positioned on a lower right portion of the captured image 812, it can be placed in other regions (e.g., around the middle, top right, top left, bottom, etc.). The captured image 812 shown in FIG. 9A may be a grayscale image, however, the present disclosure is not limited thereto.

Figure 9B:
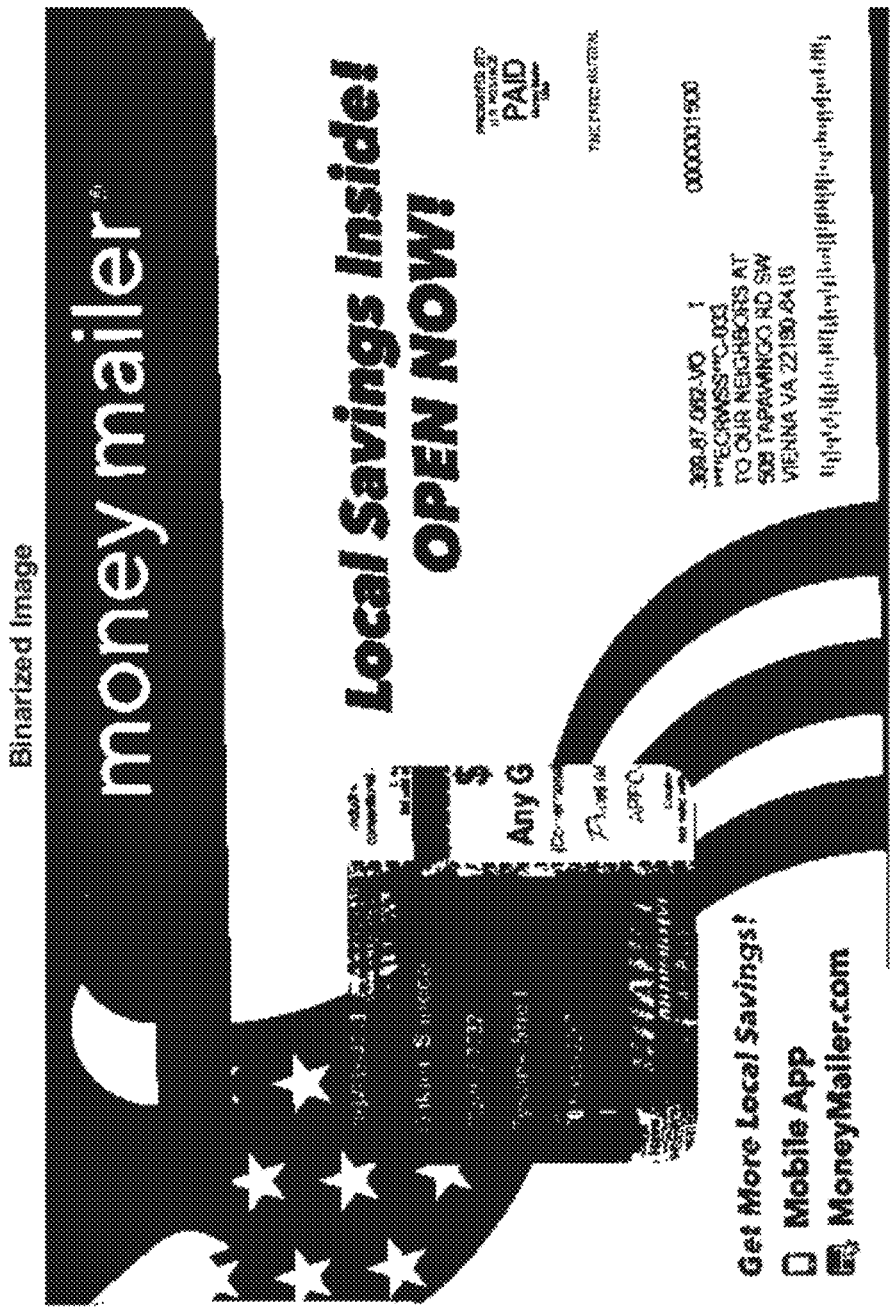

In state 820, the controller 350 may binarize the received or retrieved captured image 812. An example of the binarized image 822 is shown in FIG. 9B. Although the FIG. 8 embodiment shows that the controller 350 receives or retrieves the captured image in an analog form, and binarizes the received or retrieved image, the present disclosure is not limited thereto. For example, the controller 350 may receive binarized captured image from the scanner (320, 425 or 435) or retrieve the binarized captured image from the memory 360. In these embodiments, one or more of the scanners may capture an image of an item and convert the captured image into binary data. The binarized captured image may be stored in the memory 360. The step of binarizing the captured image may be omitted, and one of skill in the art would understand that the binarizing step can be optionally included or excluded.

Figure 9C:
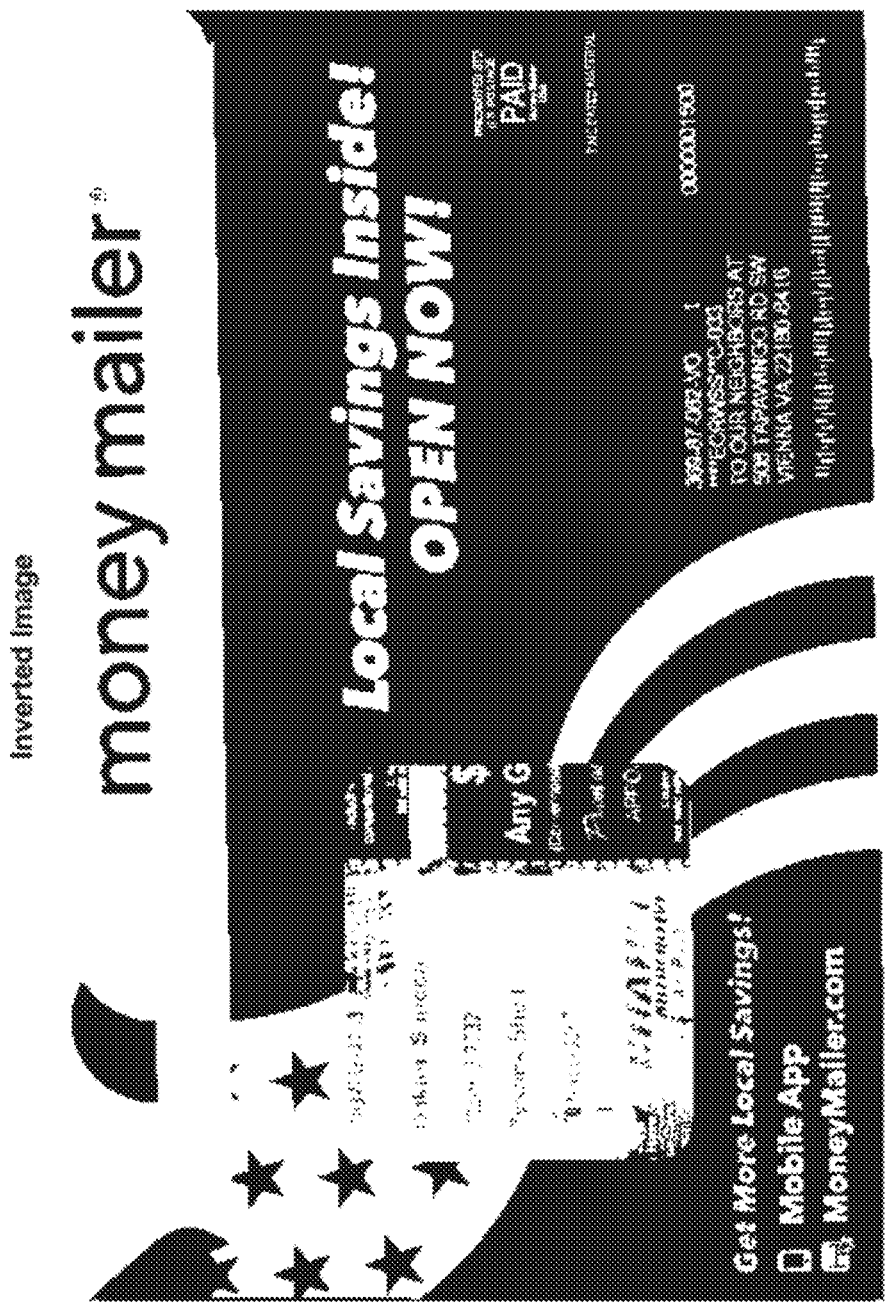

In state 830, the controller 350 may invert pixel values of the binarized image 822 to analyze relevant information effectively. An example of the inverted image 832 is shown in FIG. 9C.

Figure 9D:

In state 840, the controller 350 may perform initial filtering on the inverted image 832. An example of the initial filtered image 842 is shown in FIG. 9D where most other objects except for the barcode 814 are removed. In some embodiments, the controller 350 may use lengths of a major axis and a minor axis of the barcode 814 to perform the initial filtering. The initial filtering may include calculating component statistics (e.g., lengths of major and minor axes) for the inverted image, and filtering the image based on image properties. An example length of the minor axis is 4 and an example length of the major axis 14. However, these numbers are merely examples, and other lengths are also possible. Similarly to the address block detection described above, DBSCAN can be used to detect the barcode from the filtered components.

The controller 350 may perform state 840 using, for example, the following MATLAB function (Function #4). However, the present disclosure is not limited thereto.

Function #4
```
% Calculate connected component statistics
  ccStats=regionprops("table",imbwinv,"MinoraxisLen-
    gth","MajoraxisLength");
  minorAxisLengthUpperBound=4;
  majorAxisLengthUpperBound=14;
% Filter image based on image properties.
  imBC=bwpropfilt(imbwinv, 'MajorAxisLength', [0,
    majorAxisLengthUpperBound]);
  imBC=bwpropfilt(imBC, 'MinorAxisLength', [0, mino-
    rAxisLengthUpperBound]);
% Show Image
  imshow(imBC)
  title("Initial Filtered Components")
```

Figure 9E:
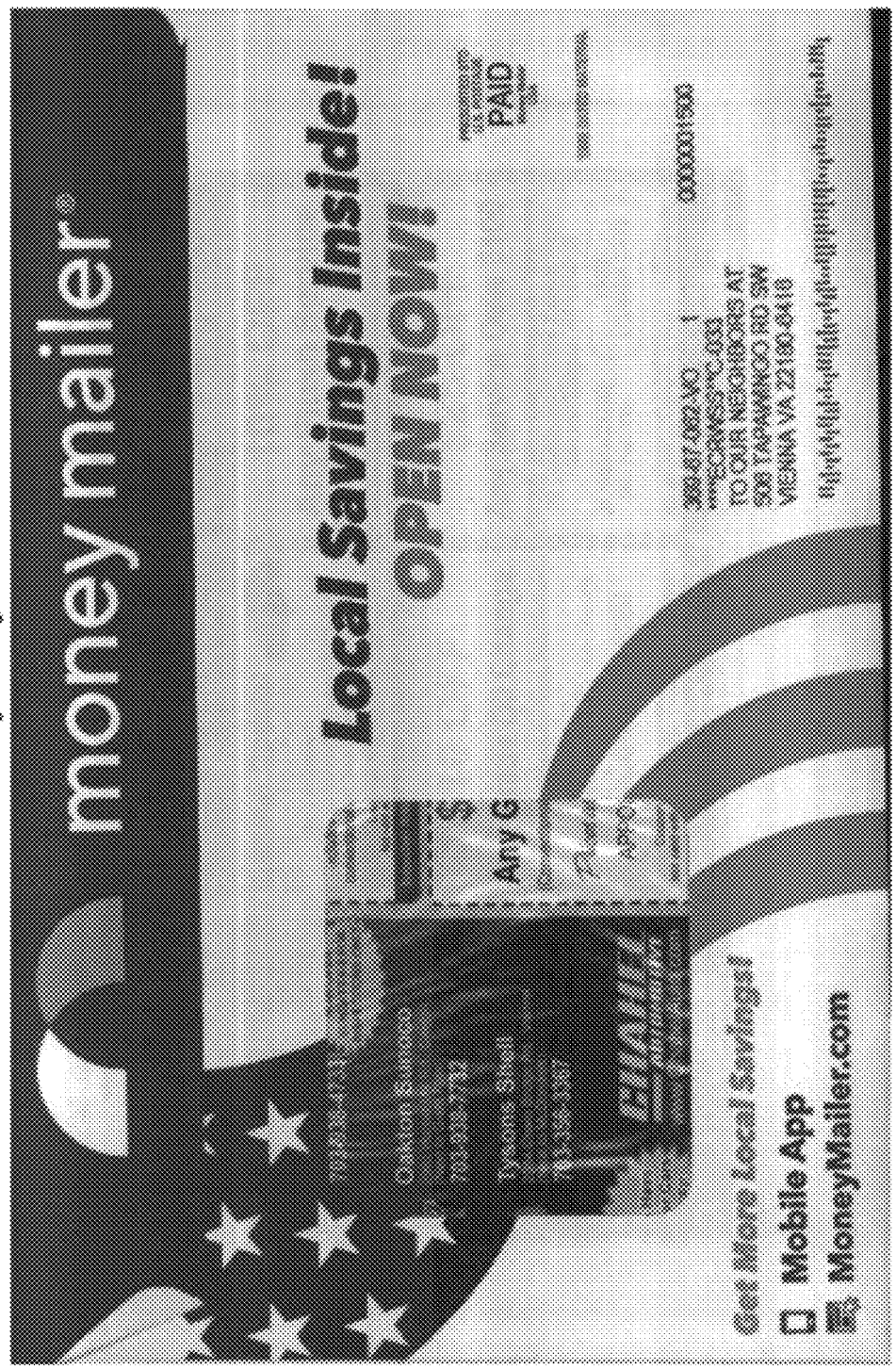

In state 850, the controller 350 may use machine learning to cluster characters into groups. The controller 350 may perform machine learning using the initial filtered components of the filtered image 842 shown in FIG. 9D that includes the barcode 814. The barcode 814 is an exemplary IMb. FIG. 9E shows an example image 852 containing initial filtered objects filtered by cluster. The controller 350 may perform state 850 using, for example, the following MATLAB function (Function #5). However, the present disclosure is not limited thereto.

Function #5

```
% Calculate statistics on remaining components
bcStats =
regionprops("table",imBC,"MinoraxisLength","MajoraxisLength","Orientation","BoundingBox")
% Setting DBSCAN Parameters
epsilon = 10;
```

| Function #5 |
| --- |

```
minpts = 5;
bcStats.Group = dbscan(bcStats.Centroid,epsilon,minpts);
if max(bcStats.Group) < 0
   disp("Warning: No groups detected")
end
grps = unique(bcStats.Group);
grps(grps == -1) = [ ];
imDisp = im;
cmap = colormap("prism");
for gi = 1 : numel(grps)
   grpData = bcStats(bcStats.Group == gi,:);
   cData = vertcat(grpData.PixelList{:});
   for pxi = 1 : size(cData,1)
      pxl = cData(pxi,:);
      imDisp(pxl(2),pxl(1),1) = cmap(gi,1)*255;
      imDisp(pxl(2),pxl(1),2) = cmap(gi,2)*255;
      imDisp(pxl(2),pxl(1),3) = cmap(gi,3)*255;
   end
end
imshow(imDisp)
title("Filtered Objects by Cluster")
```

In state 860, the controller 350 may determine the number of objects in each group. For example, Group number 1 may have 65 objects, and Group number 2 has 6 objections. These numbers are merely examples, and the present disclosure is not limited thereto. The controller 350 may perform state 860 using, for example, the following MATLAB function (Function #6). However, the present disclosure is not limited thereto.

| Function #6 |
| --- |

```
grpCounts = zeros(numel(grps),1);
for gi = 1 : numel(grps)
   grpData = bcStats(bcStats.Group == gi,:);
   grpCounts(gi) = height(grpData);
   disp("Group number " + num2str(gi) + " has " + num2str(height(grpData)) + " objects.")
end
```

In state 870, the controller 350 may select the group having the most number of objects as a barcode. In the above example, the controller 350 may determine Group number 1 having the most number of objects (e.g., 65). In some embodiments, the controller 350 may select a group having a predetermined or threshold number of objects as a barcode. In these embodiments, the predetermined or threshold number of objects may be stored in a memory. In some embodiments, the controller 350 may select two or more groups in a predetermined number range of objects (e.g., 40-50, or, 50-60, etc.) and select the group having the most number of objects in the selected groups as a barcode. In these embodiments, the predetermined number range of objects may be stored in a memory.

Figure 9F:

In state 880, the controller 350 may create a bounding box 864 for the image to be used for training a barcode detector (e.g., the controller 350 or a barcode detecting module of the controller 350) based on the selected group. FIG. 9F shows an example image 862 containing a bounding box 864 for the image to be used for training the barcode detector. The controller 350 may perform state 880 using, for example, the following MATLAB function (Function #7). However, the present disclosure is not limited thereto.

```
Function #7
% Extract the data for our biggest group
bcStats=bcStats(bcStats.Group==maxGroup,:);
% Calculate the bounding box for the overall group
bcPixelList=vertcat(bcStats.PixelList{:});
minX=min(bcPixelList(:,1))-2;
maxX=max(bcPixelList(:,1))+2;
minY=min(bcPixelList(:,2))-2;
maxY=max(bcPixelList(:,2))+3;
h=maxY-minY;
w=maxX-minX;
bbox=[minX,minY,w,h];
imbcAnnotated=insertObjectAnnotation(im,'rectangle',
   bbox,"Barcode");
imshow(imbcAnnotated)
title("Annotated Image")
```

In state 890, the controller 350 may extract the barcode and save the extracted barcode in a memory.

Barcode Reading

Figure 10:
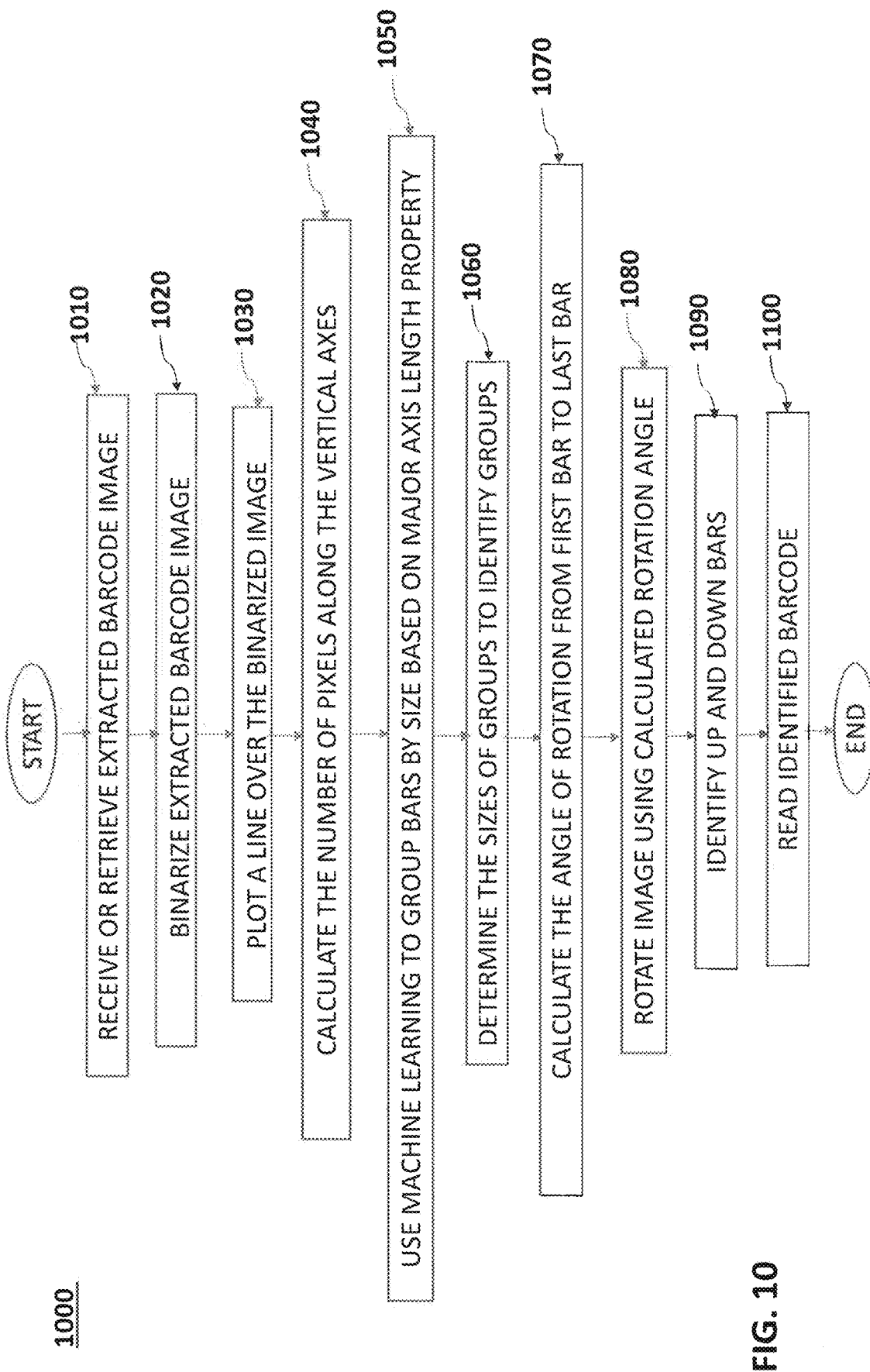
FIG. 10 is a process flow diagram of a method for reading the detected barcode according to some embodiments.

FIG. 10 is a process flow diagram 1000 of a method for reading the detected barcode block on a captured image of an item according to some embodiments. FIGS. 11A-11F are diagrams for explaining the process flow diagram of FIG. 10 according to some embodiments. In some embodiments, the process flow diagram 1000 may be performed by at least one of the optical scanner (320/425/435) or the controller 350. In some embodiments, the process flow diagram 1000 may be performed by another computing device separate from and/ or in data communication with at least one of the optical scanner (320/425/435) or the controller 350. For the purpose of convenience, the embodiments of FIGS. 10 and 11A-11F will be described based on the controller 350 performing the process flow diagram 1000. Although the process flow diagram 1000 is described herein with reference to a particular order, in various embodiments, states herein may be performed in a different order, or omitted, and additional states may be added.

Figure 11A:
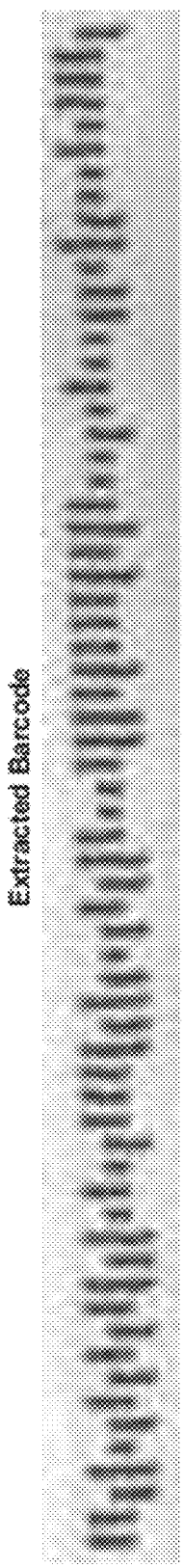
FIGS. 11A-11F are diagrams for explaining the process flow diagram of FIG. 10 according to some embodiments.

Referring to FIG. 10, in state 1010, the controller 350 may receive or retrieve an extracted barcode image. The controller 350 may receive the extracted barcode image from a scanner such as one or more scanners 320, 425 or 435 shown in FIG. 3 and FIG. 4. In some embodiments, the extracted barcode may be the product of a process similar to that described in FIG. 8. The controller 350 may also retrieve the extracted barcode image from a memory such as the memory 360 shown in FIG. 3. An example of the extracted barcode image 1012 is shown in FIG. 11A.

Figure 11B:
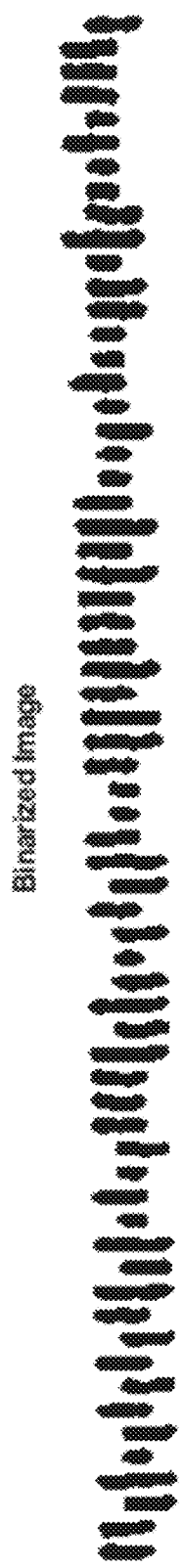

In state 1020, the controller 350 may binarize the received or retrieved barcode image 1012. An example of the binarized barcode image 1022 is shown in FIG. 11B. Although the FIG. 10 embodiment shows that the controller 350 receives or retrieves the barcode image in an analog form, and binarizes the received or retrieved image, the present disclosure is not limited thereto. For example, the controller 350 may receive binarized barcode image from the scanner (320, 425 or 435) or retrieve the binarized barcode image from the memory 360. In these embodiments, one or more of the scanners may capture an image of an item and convert the captured image into binary data. The binarized barcode image may be stored in the memory 360. The step of binarizing the captured image may be omitted, and one of skill in the art would understand that the binarizing step can be optionally included or excluded.

Figure 11C:
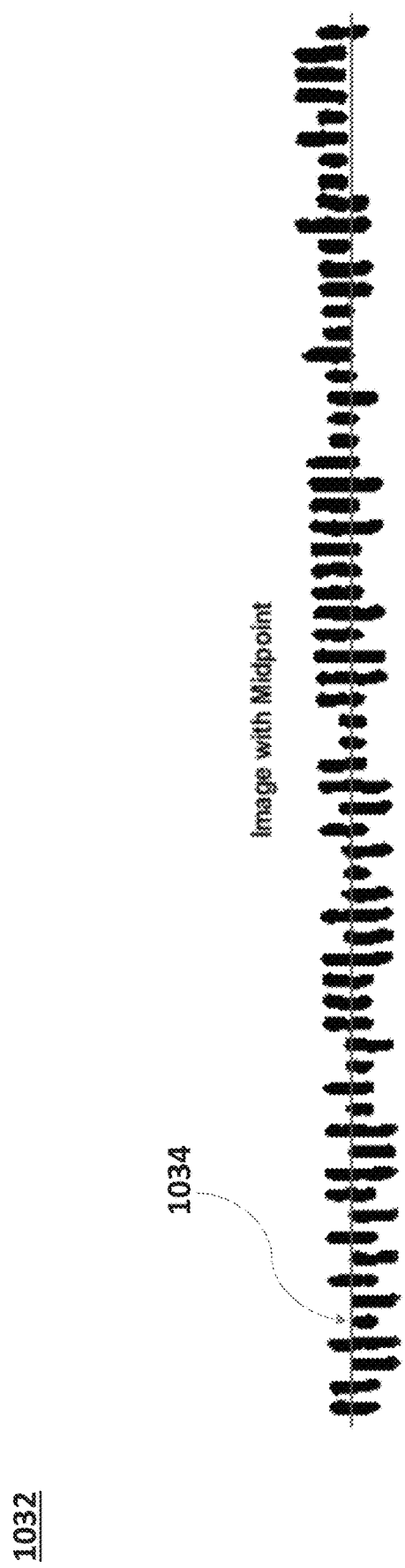

In state 1030, the controller 350 may plot a line 1034 over the binarized image. The line 1034 may be horizontal. An example of the plotted barcode image 1032 is shown in FIG. 11C. The horizontal line 1034 may be plotted through a vertical midpoint of the binarized image. However, the present disclosure is not limited thereto. For example, the horizontal line 1034 may be plotted through a line higher or lower than the vertical midpoint of the binarized image. The binarized barcode image 1032 may include slightly rotated bars, for example, as shown in FIG. 11C. This slight rotation may complicate the ability to detect the difference between ascending bars and descending bars using the location alone. The controller 350 may plot the horizontal line 1034 over the binarized image to provide a better visual of how much the bars have been rotated as shown in FIG. 11C. The controller 350 may perform state 1030 using, for example, the following MATLAB function (Function #8). However, the present disclosure is not limited thereto.

Function #8
   % Calculate image dimensions to plot horizontal line.
   imWidth=size(imbwbc,2);
   imHeight=size(imbwbc,1);
   imMidHeight=imHeight/2;
   % Show the binarized image
   imshow(imbwbc)
   hold on
   % Plot a horizontal line at the midpoint
   plot([0, imWidth],[imMidHeight,imMidHeight])
   hold off
   title("Image with Midpoint")

Some embodiments use methods of calculating the angle of rotation needed to properly identify the barcode state. Just as there are multiple methods of reading the barcode there are multiple methods to choose when determining the angle of rotation. In some embodiments, the controller 350 may use properties of components of the binarized image to make the adjustment. For example, a given bar type (ascending bar, descending bar, full bar, or tracking bar) is evenly across the horizontal axes. The tracking bars may have the fewest number of pixels. The full bars may have the highest number of pixels. The ascending bar and descending bar may have a pixel number with a range in the middle.

The controller 350 may use the objects' centroid as a positional measurement as this can be robust to scale, printer, and binarization variations. As the centroids will shift with each bar type, the controller 350 may first filter the objects to identify a single bar type.

In state 1040, the controller 350 may calculate the number of pixels along the vertical axes of bars of the barcode. In some embodiments, the number of pixels in the bars of the barcode can be counted extending upward from the line 1034, and downward from the line 1034, and then can be combined to generate the total number of pixels. In some embodiments, the number of pixels is counted from the bottom to the top of each bar of the barcode. The controller 350 may perform state 1040 using, for example, the following MATLAB function (Function #9). However, the present disclosure is not limited thereto.

Figure 11D:
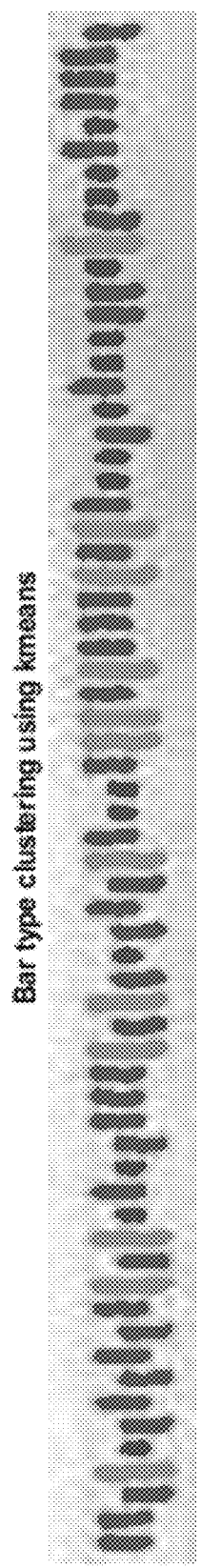

Function #9
   % Calculate the number of pixels along the vertical axes.
   % Note that the image was inverted to count the black
      pixels not the white.
   barHeight=sum(~imbwbc,1);
   % Plot the results
   plot(barHeight);
   title("Visualizing bar height")
   xlim([0, imWidth]);

In state 1050, the controller 350 may use machine learning to group bars by size based on major axis length property. An example of the barcode image 1042 with grouped bars is shown in FIG. 11D. To provide examples of using unsupervised machine learning, the controller 350 may use the k-means method of grouping the bars by their size. One benefit of this method versus manually coding pixel limits is that it is very robust for gain variations in resolution of the input image. The controller 350 may cluster the bars based on the major axis length property. The controller 350 may perform state 1050 using, for example, the following MATLAB function (Function #10). However, the present disclosure is not limited thereto.

Function #10

% Calculated the connected component properties.
ccStats = regionprops("table",~imbwbc,"MajoraxisLength","Centroid","BoundingBox","PixelList");
% Use k-means to cluster the objects by major axis length.
ccStats.BarTypeGroupNumber = kmeans(ccStats.MajorAxisLength,3);
% Create the color map to visualize groups
cmap = [...
   1.00 , 0.00 , 0.00;...
   0.00 , 1.00 , 0.00;...
   0.00 , 0.00 , 1.00;...

-continued

Function #10

```
    0.66 , 0.66 , 0.66];
% Identify the number of groups. Although we know there are only three this % method make more
portable code and would likely be used in a function for % visualizing groups of various sizes.
grps = unique(ccStats.BarTypeGroupNumber);
% Remove outlier group. This step is generally only needed with DBSCAN but
% for the same reasons as above we will leave it here as it will not have
% negative effects.
grps(grps == −1) = [ ];
% Create display image
imDisp1(:,:,1) = imbc;
imDisp1(:,:,2) = imbc;
imDisp1(:,:,3) = imbc;
% Itterate through each group using the color map generated above to change
% the pixel values of each object within the group to the same color.
for gi = 1 : numel(grps)
    % Extract a subset of the data to extract just this groups stats
    grpData = ccStats(ccStats.BarTypeGroupNumber == gi,:);
    % Concatinate the list of pixels into a single vector
    cData = vertcat(grpData.PixelList{:});
    % Change each pixel
    for pxi = 1 : size(cData,1)
        pxl = cData(pxi,:);
        for ci = 1 : 3
            imDisp1(pxl(2),pxl(1),ci) = cmap(gi,ci)*255;
        end
    end
end
% Show the clusted image
imshow(imDisp1)
title("Bar type clustering using kmeans")
```

In state 1060, the controller 350 may determine the sizes of groups to identify different individual groups. The k-means method may properly identify the three groups of bar sizes. However, one of the characteristics of k-means is that unless starting points are provided for the clustering algorithm, the controller 350 may not know which group represents the smallest, middle, or largest sizes ahead of time. The controller 350 may perform some basic calculations to properly identify the groups. The controller 350 may perform state 1060 using, for example, the following MATLAB function (Function #11). However, the present disclosure is not limited thereto.

Function #11

```
% Pre-allocate groupHeight
gpHeight = zeros(3,1);
for ii = 1 : 3
    % Get the average height of the three groups
    gpHeight(ii) = mean(ccStats.MajorAxisLength(ccStats.BarTypeGroupNumber == ii));
end
% Find the tracking bar group number
[ ~ , trackingBarGpNum ] = min(gpHeight);
%[fullBarHeight, fullBarGpNum] = max(gpHeight);
```

In state 1070, the controller 350 may calculate the angle of rotation from the first bar to the last bar of the barcode. The controller 350 may use the coordinates for the no bar group to calculate the angle of rotation. For example, the controller 350 may identify the centroids for the first and last tracking bars by looking at the minimum and maximum values from the horizontal axes of the centroids. To calculate the angle of rotation from the first bar to the last bar, the controller 350 may calculate the change in the x and y axes. The controller 350 may perform state 1070 using, for example, the following MATLAB function (Function #12). However, the present disclosure is not limited thereto.

Function #12

```
% Extract the cc stats for just the tracking bars
trackingBarStats=ccStats
    (ccStats.BarTypeGroupNumber==trackingBarGpNum,:);
% Find the first and last tracking bars
[minCentroidX,minCentIdx]=min(trackingBarStats.Centroid(:,1));
[maxCentroidX,maxCentIdx]=max(trackingBarStats.Centroid(:,1));
% Extract the centroid for the first and last tracking bar
firstCentriod=trackingBarStats.Centroid(minCentIdx,:);
lastCentriod=trackingBarStats.Centroid(maxCentIdx,:);
```

Figure 11E:

In state 1080, the controller 350 may rotate the image using the calculated rotation angle. An example of the rotated barcode image 1052 is shown in FIG. 11E. Although the FIG. 11E embodiment shows that the image is rotated around the midpoint, the present disclosure is not limited thereto. For example, the barcode image may be rotated around a line higher or lower than the midpoint of the binarized image. The controller 350 may perform state 1080 using, for example, the following MATLAB function (Function #13). However, the present disclosure is not limited thereto.

Function #13
```
    imbcRot=~imrotate(~imbwbc,rotAngle,"nearest",
       "crop");
    % Calculate image dimensions for plotting horizontal
       line.
    imWidth=size(imbcRot,2);
    imHeight=size(imbcRot,1);
    imMidHeight=imHeight/2;
    % Show rotated image with equator
    imshow(imbcRot)
    hold on
    plot([0, imWidth],[imMidHeight,imMidHeight])
    hold off
    title("Rotated Image with Midpoint"
```

Figure 11F:
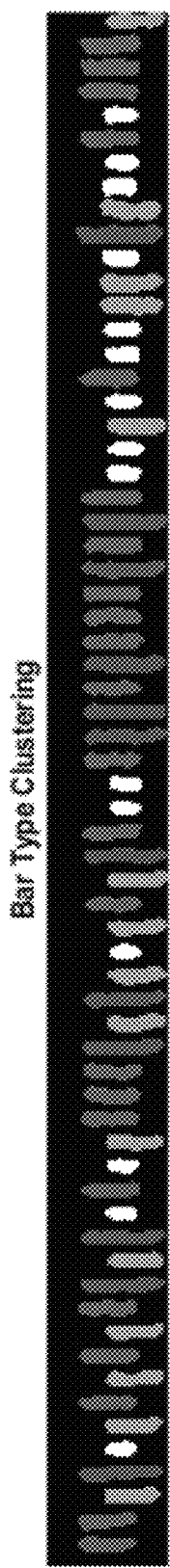

In state 1090, the controller 350 may identify up-bars and down-bars from the plurality of bars of the barcode to identify the barcode. An example of the clustered bar type 1062 is shown in FIG. 11F. The controller 350 may perform state 1090 using, for example, the following MATLAB function (Function #14). However, the present disclosure is not limited thereto.

Function #14
```
bcStats = regionprops("table",~imbcRot,"Centroid","MajoraxisLength","PixelList");
bcStats.Group = kmeans(bcStats.MajorAxisLength,3);
% Get the average height of the three groups
gpHeight(1) = mean(bcStats.MajorAxisLength(bcStats.Group == 1));
gpHeight(2) = mean(bcStats.MajorAxisLength(bcStats.Group == 2));
gpHeight(3) = mean(bcStats.MajorAxisLength(bcStats.Group == 3));
[trackingBarHeight, trackingBarGpNum] = min(gpHeight);
[fullBarHeight, fullBarGpNum] = max(gpHeight);
bcStats.BarType(:) = "Unknown";
bcStats.BarType(bcStats.Group == trackingBarGpNum) = "T";
bcStats.BarType(bcStats.Group == fullBarGpNum) = "F";
bcStats.CentGroup = kmeans(bcStats.Centroid(:,2),3);
gpCent(1) = mean(bcStats.Centroid(bcStats.CentGroup == 1,2));
gpCent(2) = mean(bcStats.Centroid(bcStats.CentGroup == 2,2));
gpCent(3) = mean(bcStats.Centroid(bcStats.CentGroup == 3,2));
[upBarCent, upBarGpNum] = min(gpCent);
[downBarHeight, downBarGpNum] = max(gpCent);
bcStats.BarType(bcStats.CentGroup == upBarGpNum) = "A";
bcStats.BarType(bcStats.CentGroup == downBarGpNum) = "D";
bcStats.BarType = categorical(bcStats.BarType);
barCats = categories(bcStats.BarType);
imDisp = [ ];
for gi = 1 : numel(barCats)
   grpData = bcStats(bcStats.BarType == barCats(gi),:);
   cData = vertcat(grpData.PixelList{:});
   for pxi = 1 : size(cData,1)
     pxl = cData(pxi,:);
     for ci = 1 : 3
        imDisp(pxl(2),pxl(1),ci) = cmap(gi,ci)*255;
     end
   end
end
imshow(imDisp)
title("Bar Type Clustering")
```

In state 1100, the controller 350 may read the identified barcode. Since the bar types have been properly identified, the controller 350 may sort the bar types along the horizontal axes from left to right. The controller 350 may use a standard IMb (intelligent mail barcode) decoding engine to convert the A,D,F,T to numerical data.

The processes described in FIG. 10 and illustrated in FIGS. 11A-11F show a process of reading a 4-state barcode, such as an IMb. A person of skill in the art, guided by this disclosure, would understand how to read other types of barcodes using processes similar to those described herein, without departing from the scope of the current disclosure. For example, pixel measurements along major axes or counting vertical pixels can be adapted to read the width of barcode bars, both black and white. And grouping bars by size based on major axis length can be modified to group bars by size based on a width or thickness of a bar. Those of skill in the art will understand that this is not a complete list of modifications to the described processes to read other types of barcodes, but is exemplary only.

Figure 12:
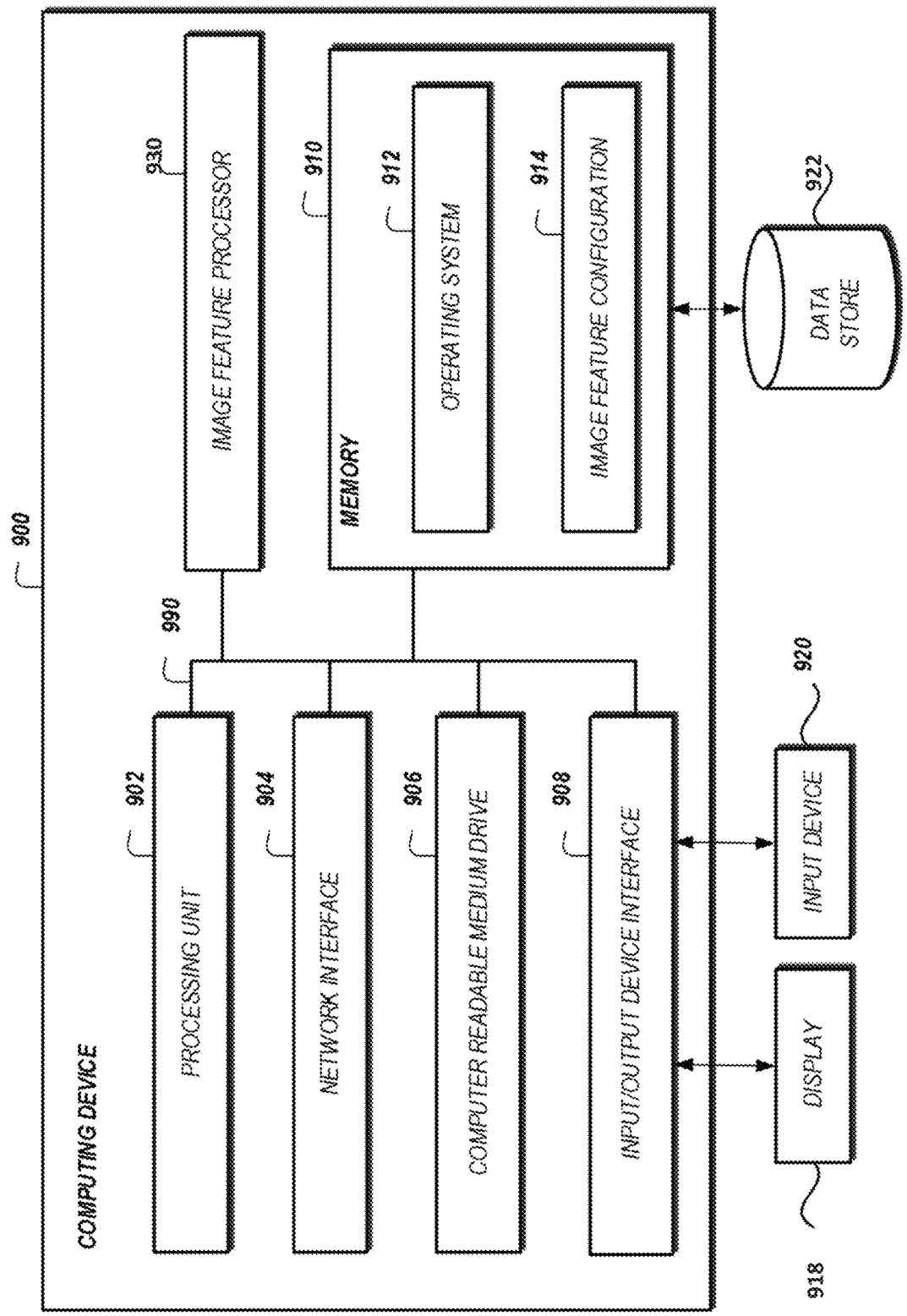
FIG. 12 is a block diagram of an example controller illustrated in FIG. 3 according to some embodiments.

FIG. 12 is a block diagram of an embodiment of a computing device 900 for implementing the process flow diagrams 600, 800, and 1000 described above with respect to FIGS. 6, 8 and 10. FIG. 12 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. In some embodiments, the computing device 900 may implement the features of one or more of the optical scanners 320/425/435 and the controller 350. In some embodiments, at least some elements of the computing device 900 may be included in one or more of the optical scanners 320/425/435 and the controller 350 to perform an entirety or part of the flow diagrams shown in FIGS. 6, 8 and 10. In still other embodiments, the computing device 900 may be in data communication with one or more of the optical scanners 320/425/435 and the controller 350 to perform an entirety or part of the procedures shown in FIGS. 6, 8 and 10.

The network interface 904 can provide connectivity to one or more networks or computing systems. The network interface 904 can receive information and instructions from other computing systems or services via the network interface 904. The network interface 904 can also store data directly to the memory 910. The processing unit 902 can communicate to and from the memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more of the embodiments described above. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 12. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method of detecting an address block from a captured image of an item, the method comprising:
   receiving or retrieving, at a processor, a captured image of the item containing an address block;
   inverting, at the processor, pixel values of the captured image;
   processing, at the processor, the inverted pixel values of the captured image;
   filtering, at the processor, the processed image by area;
   machine learning, at the processor, the processed image to cluster objects in the processed image into a plurality of groups using the filtered image;
   determining, at the processor, a number of objects in each of the clustered groups by performing additional operations on the clustered objects to detect the address block; and
   selecting, at the processor, at least one of the clustered groups as the address block based on the determined number of objects.

2. The method of claim 1, wherein the selecting comprises selecting a group of the at least one of the clustered groups having the greatest number of objects as the address block.

3. The method of claim 1, wherein the selecting comprises selecting a group of the at least one of the clustered groups having a predetermined number of objects as the address block.

4. The method of claim 1, wherein the selecting comprises:
selecting two or more groups in a predetermined number range of objects from the clustered groups; and
selecting a group having the greatest number of objects in the selected two or more groups as the address block.

5. The method of claim 1, further comprising:
extracting, at the processor, the selected address block; and
storing, in a memory, the extracted address block.

6. The method of claim 5, further comprising reading the extracted address block using an optical character recognition (OCR) process or artificial intelligence (AI).

7. The method of claim 1, wherein the machine learning comprises performing unsupervised machine learning on the processed image to cluster the objects into the plurality of groups.

8. The method of claim 7, wherein the unsupervised machine learning comprises a density-based spatial clustering of applications with a noise (DBSCAN) algorithm.

9. The method of claim 1, wherein the filtering comprises filtering components of the processed image to a given range of sizes such that all components outside of minimum and maximum ranges are removed from the processed image.

10. The method of claim 1, wherein the machine learning comprises identifying a barcode based on at least one of a width, a height, or an orientation of the objects being clustered.

11. A system for detecting an address block from a captured image of an item, the system comprising:
a memory storing instructions; and
one or more processors configured to execute the instructions to:
receive or retrieve a captured image of the item containing an address block;
invert pixel values of the captured image;
process the inverted pixel values;
filter the processed image by area;
perform machine learning on the processed image to cluster objects in the processed image into a plurality of groups using the filtered image;
determine a number of objects in each of the clustered groups by performing additional operations on the clustered objects to detect the address block; and
select at least one of the clustered groups as the address block based on the determined number of objects.

12. The system of claim 11, wherein at least one of the one or more processors is configured to select a group of the at least one of the clustered groups having the greatest number of objects as the address block.

13. The system of claim 11, wherein at least one of the one or more processors is configured to select a group of the at least one of the clustered groups having a predetermined number of objects as the address block.

14. The system of claim 11, wherein at least one of the one or more processors is configured to:
select two or more groups in a predetermined number range of objects from the clustered groups; and
select a group having the greatest number of objects in the selected two or more groups as the address block.

15. The system of claim 11, wherein at least one of the one or more processors is further configured to:
extract the selected address block; and
store, in a memory, the extracted address block.

16. The system of claim 11, wherein at least one of the one or more processors is configured to perform unsupervised machine learning on the processed image to cluster the objects into the plurality of groups.

17. The system of claim 16, wherein the unsupervised machine learning comprises a density-based spatial clustering of applications with a noise (DBSCAN) algorithm.

18. The system of claim 11, wherein at least one of the one or more processors is configured to filter components of the processed image to a given range of sizes such that all components outside of minimum and maximum ranges are removed from the processed image.

19. The system of claim 11, wherein at least one of the one or more processors is configured to identify a barcode based on at least one of a width, a height, or an orientation of the objects being clustered.

20. A non-transitory computer readable medium for storing instructions that cause, when executed by one or more processors, the one or more processors to:
receive a captured image of the item containing an address block;
invert pixel values of the captured image;
process the inverted pixel values of the captured image;
filter the processed image by area;
perform machine learning the processed image to cluster objects in the processed image into a plurality of groups using the filtered image;
determine a number of objects in each of the clustered groups by performing additional operations on the clustered objects to detect the address block; and
select at least one of the clustered groups as the address block based on the determined number of objects.

* * * * *